(12) United States Patent
    Cramer

(10) Patent No.: US 11,343,475 B2
(45) Date of Patent: May 24, 2022

(54) DISPLAY SYSTEM HAVING LENS SHEETS HAVING DIFFERENT POLARITIES

(71) Applicant: Hyperstealth Biotechnology Corporation, Maple Ridge (CA)

(72) Inventor: Guy Cramer, Maple Ridge (CA)

(73) Assignee: Hyperstealth Biotechnology Corporation, Maple Ridge (CA)

( * ) Notice: Subject to any disclaimer, the term of this patent is extended or adjusted under 35 U.S.C. 154(b) by 0 days.

(21) Appl. No.: 16/971,403

(22) PCT Filed: Feb. 13, 2019

(86) PCT No.: PCT/CA2019/000019
§ 371 (c)(1),
(2) Date: Aug. 20, 2020

(87) PCT Pub. No.: WO2019/161478
PCT Pub. Date: Aug. 29, 2019

(65) Prior Publication Data
US 2021/0092335 A1    Mar. 25, 2021

Related U.S. Application Data

(60) Provisional application No. 62/693,959, filed on Jul. 4, 2018, provisional application No. 62/632,526, filed on Feb. 20, 2018.

(51) Int. Cl.
    *H04N 9/31*     (2006.01)
    *F41H 5/08*     (2006.01)
    *G02B 3/00*     (2006.01)
    *G03B 21/10*    (2006.01)
    *G03B 21/28*    (2006.01)
    (Continued)

(52) U.S. Cl.
    CPC ............. *H04N 9/3152* (2013.01); *F41H 5/08* (2013.01); *G02B 3/005* (2013.01); *G03B 21/10* (2013.01); *G03B 21/28* (2013.01); *G03B 21/604* (2013.01); *G03B 21/625* (2013.01); *G03B 35/26* (2013.01)

(58) Field of Classification Search
    CPC ........ G03B 21/10; G03B 21/28; G03B 21/62; G03B 21/604; G03B 21/625; G03B 35/20; G03B 35/16; G03B 35/24; G03B 35/26; H04N 9/3102; H04N 9/3105; H04N 9/3141; H04N 9/3152; H04N 9/3158; H04N 9/3167; H04N 9/3185
    See application file for complete search history.

(56) References Cited

U.S. PATENT DOCUMENTS 3,791,712 A    2/1974  Miyagi
4,078,854 A    3/1978  Yano
        (Continued)

FOREIGN PATENT DOCUMENTS

CN    102346367 A      2/2012
WO    2017007526 A2    1/2017

*Primary Examiner* — Sultan Chowdhury
(74) *Attorney, Agent, or Firm* — McMillan LLP

(57) ABSTRACT

The present invention relates to display systems that use materials made from various arrangements of lenses and other optical materials. Careful design and use of these materials can be used to achieve display systems with many desirable visual effects having applicability in image and video displays, virtual reality, immersive environments, as well as in architecture, art, entertainment, and interactive systems.

34 Claims, 18 Drawing Sheets

(51) Int. Cl.
*G03B 21/604* (2014.01)
*G03B 21/625* (2014.01)
*G03B 35/26* (2021.01)

(56) References Cited

U.S. PATENT DOCUMENTS

| | | | |
|---|---|---|---|
| 5,011,277 | A | 4/1991 | Ogino et al. |
| 5,647,151 | A | 7/1997 | Fantone et al. |
| 7,061,676 | B2 | 6/2006 | Kumagai et al. |
| 9,632,404 | B2 * | 4/2017 | Grundhofer ............ G02F 1/313 |
| 11,199,814 | B2 * | 12/2021 | Chen .................... G04B 37/005 |
| 11,201,184 | B1 * | 12/2021 | Lu .......................... G01S 17/89 |
| 2003/0025995 | A1 | 2/2003 | Redert et al. |
| 2012/0057131 | A1 | 3/2012 | Li et al. |
| 2012/0069435 | A1 | 3/2012 | Oikawa et al. |
| 2012/0287037 | A1 * | 11/2012 | Shikii .................. H04N 13/376 |
| | | | 345/156 |
| 2013/0033650 | A1 | 2/2013 | Roberts et al. |
| 2016/0373731 | A1 * | 12/2016 | Smoot .................... G03B 35/26 |

* cited by examiner

DISPLAY SYSTEM HAVING LENS SHEETS HAVING DIFFERENT POLARITIES

RELATED APPLICATIONS

This application claims priority from: U.S. Provisional Patent Applications No. 62/632,526 filed Feb. 20, 2018; and 62/693,959 filed Jul. 4, 2018 the contents of each of which are herein expressly incorporated by reference in their entirety.

TECHNICAL FIELD

The present invention relates to improved display systems generally, and in particular to the use of materials that interact with light to create improved displays suitable for use in simulated or immersive environments.

BACKGROUND ART

Display systems used in conjunction with simulators, virtual reality systems and augmented reality technologies which allow users to interact with, at least partially, simulated environments are known. Such conventional systems typically rely on computer monitors or stereoscopic displays and are primarily visual in nature, although the systems are sometimes augmented with audio or haptic feedback. Popular examples include flight simulator video games in which the players pilot virtual aircraft in a computer-simulated digital environment.

Augmented reality (AR) often refers to the combination of real world objects and computer generated digital data. Conventionally, AR uses of video and images that are digitally processed and augmented with the addition of computer-generated graphics.

Systems involving the use cameras that capture and track a user's position and movement are also known. For example, U.S. Pat. No. 8,009,022 describes a system that includes a depth camera that captures user position and movement, a three-dimensional (3D) display device that presents the user a virtual environment in 3D and a haptic feedback device that interfaces to the user via the sense of touch by applying, for instance, on or more of forces, vibrations and motions to the user to provide haptic feedback as he or she interacts with a virtual object in the virtual environment.

As the user moves through his physical space, his or her image is captured by the depth camera. Data from that depth camera is parsed to correlate the user's position with a position in the virtual environment. Where the user position or movement causes the user's representation in the virtual environment to touch a virtual object, a corresponding haptic feedback is provided to the user. Haptic feedback is provided through use of a glove coupled to the user's arm, the glove containing a plurality of electrodes that may provide a mild electrical stimulation to the user. When the user makes a movement in his or her physical environment that corresponds to grasping a virtual cylinder, the system may determine that this has occurred, and provide haptic feedback to the palm and fingers of the user that provides a similar haptic experience for the user as if he or she had grasped a physical cylinder within the physical space.

Other forms of interactive or virtual systems include displays that facilitate concealment, camouflaging and other simulated visual effects. This has helped inspire research into light and light-bending materials and related studies of effective arrangements optical instruments in order to achieve the desired effect. Much theoretical progress has been made in attempts to model culminating in a theoretical framework for a field of research sometimes called transformation optics.

Although many systems exist that simulate interesting and useful visual environments, such systems have often proven costly, requiring sophisticated and powerful processing capabilities, cameras used for tracking positions and movements, and algorithms to adapt generated or displayed video data with expected visual imagery. Improvements are thus desired. It is an object of the present invention to provide improved systems for simulation, interactive display or immersive environments using cost effective approaches.

SUMMARY OF INVENTION

Aspects of the present invention involve displays and simulated systems that use materials made from various arrangements of lenses and other optical materials to achieve visual effects with applicability in display systems, virtual reality, immersive environments, as well as in architecture, art, entertainment, displays, interactive systems and the like. These materials utilize the refraction and reflection of light and other rays in the electromagnetic spectrum, to achieve desirable visual effects.

Materials that are made up of plurality of lenses, arranged in such a way as to refract or reflect one or more of visible, near infrared, near ultraviolet or other forms of light or more generally electromagnetic waves, are used to achieve the desired visual effect and simulated environment and immersive experiences. An example of such a material is a lenticular lens sheet which may have a regular or semi-regular pattern of linear or non-linear shaped lenses, which may be mixed with linear lines within the lens to at least partially reflect or refract light. A typical lenticular plastic sheet is a translucent plastic sheet which has one smooth side while the other side is made of small convex lenses called lenticules that allow the transformation of a two dimensional (2D) image into a variety of visual illusions. Each lenticule acts as a magnifying glass to enlarge and display the portion of the image below i.e., on the smooth side. Other materials that may be used include an array of small spherical lenses, known as a fly's-eye lens array, or a screen consisting of a large number of small convex lenses. Another example of a material that can be used is a linear or array prism sheet.

In accordance with an aspect of the present invention, there is provided a display system comprising: a first lens sheet having a first polarity for receiving an image from a first projector; a second lens sheet having a second polarity proximate the first lens sheet; wherein the first polarity is opposite the second polarity and wherein upon the first projector projecting a first image through the first lens sheet onto the second lens sheet, the first image is visible on the second lens sheet but not on the first lens sheet.

In accordance with an aspect of the present invention, there is provided a riot shield comprising: a clear body having an outer surface and an inner surface; a first lens sheet having a first polarity disposed over the outer surface; a second lens sheet having a second polarity, disposed proximate the inner surface and the first lens sheet, the first polarity opposite the second polarity, wherein upon a first projector in communication with a first image source projecting an image onto the first lens sheet through the second lens sheet, the image is visible on the first lens sheet but not on the second lens sheet.

In accordance with an aspect of the present invention, there is provided a display system comprising: a first lens sheet having a first polarity receiving a first image from a first projector and a second projector and receiving a second image from a second projector; a second lens sheet having a second polarity proximate the first lens sheet; wherein the first polarity is opposite the second polarity and wherein upon the first projector projecting a first image through the first lens sheet onto the second lens sheet, the first image and the second image visible on the second lens sheet but not on the first lens sheet and wherein at a first location relative to the second lens sheet, the first image is visible to an observer but not the second image, and at a second location relative to the second lens sheet, the second image is visible to an observer but not the first image.

In accordance with an aspect of the present invention, there is provided a display system comprising: a first lens sheet having a first polarity for receiving an image from a first projector; a plurality of secondary lens sheets each having a second polarity arranged adjacent one another to form at least partially enclosed space, proximate the first lens sheet; wherein the first polarity is opposite the second polarity, the first projector projects images onto an inner surface of at least one of the second lens sheets through the first lens sheet, and an observer looking at outer surfaces of any two different ones of the secondary lens sheets from outside the enclosed space, observes different views of a virtual decoy image that appears formed within the enclosed space.

In accordance with an aspect of the present invention, there is provided a method of using of lens sheets comprising: placing a first lens sheet having a first polarity proximate a second lens sheet having a second polarity, the first polarity opposite that of the second polarity; and projecting image data representative of an object through the first sheet onto the second sheet, wherein upon a first projector projecting a first image through the first lens sheet onto the second lens sheet, the first image is visible on the second lens sheet but not on the first lens sheet.

In accordance with an aspect of the present invention, there is provided a method of projecting an image onto a translucent display surface. The method involves, using a projection device to broadcast an image or video through one lenticular sheet of lenticules that run in one parallel direction (e.g., left/right or horizontally) and then at a farther distance from the first sheet, projecting onto a second lenticular sheet with lenticules running in the opposite polarity (e.g., up/down or vertically) so that the image interlaces on the second sheet thereby creating an image or video on the second lenticular sheet which remains translucent in areas where the image is not projected. The stretching of the image due to the proximity of the first sheet to the projection source and the distance between the first sheet and the second sheet can be offset by adjusting the image within the projection thereby compensating for the stretching to make the image appear as a normal aspect ratio on the second sheet.

In accordance with an aspect of the present invention, there is provided a passive display system that has: a matte having an image thereon; and a double sided lens sheet having a first polarity disposed proximate the matte wherein at a first location relative to the double sided lens sheet a first view of the image is visible to an observer; and at a second location relative to the double sided lens sheet a second observed view is visible to the observer but not the first view, wherein said second location different from the first location and said first view is different from said second view.

BRIEF DESCRIPTION OF DRAWINGS

In the figures, which illustrates by way of example only, embodiments of the present invention.

DESCRIPTION OF EMBODIMENTS

As noted above, embodiments of the present invention involve display systems and simulated environments that make use of materials made from various arrangements of lenses and other optical materials to achieve distinctive visual effects with applicability in display systems, virtual reality, immersive environments, architecture, art, entertainment, interactive systems, collaboration systems and the like. These materials utilize the refraction and reflection of light and other rays in the electromagnetic spectrum, to achieve desirable visual effects.

Principle of Refraction

It is commonly observed that as a ray of light that enters a material medium at an oblique angle changes its direction. This phenomenon is called refraction. Refraction generally involves a change in the direction of wave propagation due to a change in propagation speed. In the case of light, refraction can be traced to the slowing of the light as it enters the medium, and the speed of light is reduced from its vacuum speed $c \equiv 3 \times 10^8$ to $c/n$, where n is the refractive index of the medium.

Figure 1:
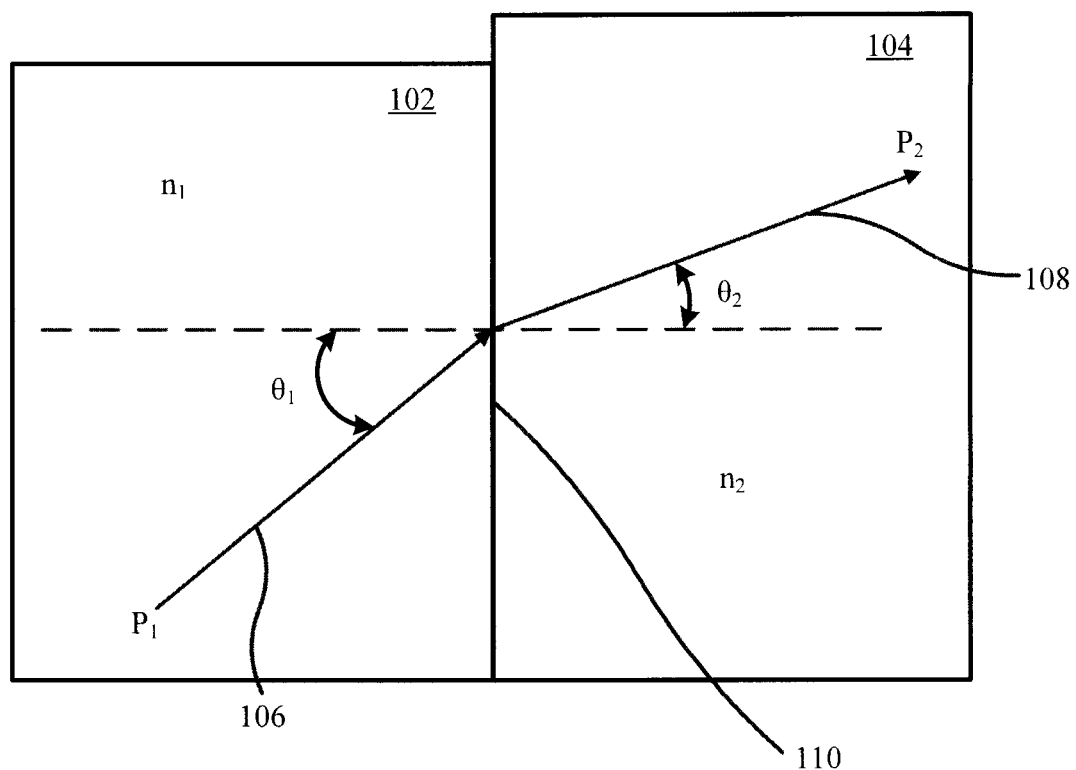
FIG. 1 is a schematic diagram illustrating the principle of the law of refraction as it relates to visible light.

FIG. 1 depicts an illustration of the law of refraction also known as Snell's law. An incident light ray 106 travels from an initial point $P_1$ through a first medium 102 such as air, and enters into a second medium 104. The incident ray 106 is refracted at the interface 110, so that the trajectory of a refracted ray 108 arrives at the point $P_2$. This is explained by Fermat's principle of minimum time, which states that light will travel from one point to another along a path that requires the minimum time. Thus the angle of incidence $\theta_1$ and angle of refraction $\theta_2$ must be such as to minimize the optical path length from $P_1$ to $P_2$. As shown in FIG. 1, if the refractive index of the first medium and the second medium are respectively $n_1$ and $n_2$, then Snell's law states that $n_1 \sin \theta_1 = n_2 \sin \theta_2$.

As noted above, materials that are made up of a large number of lenses, subsets of which are arranged adjacent to one another or in very close proximity in such a way as to refract visible, near infrared and/or near ultraviolet light are known. A typical example is the lenticular lens sheet. Lenticular lens sheets can be made of translucent plastic. Further, some lenticular lens sheets may be smooth one side and while the opposite side may be made up of small convex lenses called lenticules. These lenticules can make an otherwise ordinary two dimensional view of a scene, appear to have a variety of interesting visual effects. For example a lenticule may act as a magnifying glass.

Figure 2:
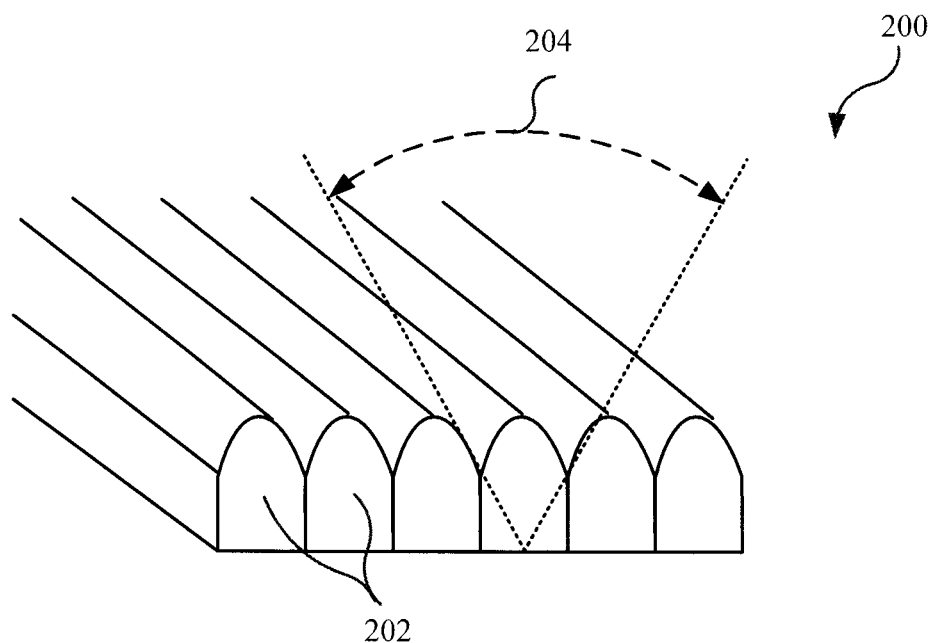
FIG. 2 is a schematic diagram of a lenticular lens sheet, partly in cross-section.

FIG. 2 is a schematic diagram of a lenticular lens sheet partly in cross-section. As shown, a lenticular sheet 200 includes a plurality of lenses or lenticules 202. Images from the lenticular lenses can be viewed within a V-shaped viewing region that corresponds to a viewing angle 204. Viewing angle 204 may be small or large. A small viewing angle 204 makes the picture very sensitive to change in the sense that a viewer just needs to turn the head slightly and a different set of pictures will be seen. For wide viewing angle 204 lenses the viewer can make a relatively large displacement or turn of his head to see a different set of pictures so the change in the viewed is not as sensitive to the displacement in the head's position or orientation. As a result, narrow viewing angle lenses are good for three dimensional (3D) effects and wide viewing angles lenses are good for dynamic prints such as animation, flip, morph or zoom.

A display that presents a three-dimensional image to a viewer without the need for special glasses or other impediments is sometimes referred to as auto-stereoscopic. The first auto-stereoscopic method to appear was the barrier technique, which involved dividing two or more pictures into stripes and aligning them behind a series of vertically aligned opaque bars of the same frequency. It was demonstrated in paintings of by G. A. Bois-Clair which would appear to change from one picture to another as a viewer walked by.

Later, physicist Gabriel M. Lippmann used a series of lenses at the picture surface instead of opaque barrier lines, and was able to record a complete spatial image with parallax in all directions. The process utilized an array of small spherical lenses, known as a fly's-eye lens array or integral lens array to record and playback the image.

Several scientists simplified the integral lens array by incorporating a lenticular lens array. A lenticular lens sheet consists of a linear array of thick plano-convex cylindrical lenses. The lens sheet is transparent and the rear face, which constitutes the focal plane, is flat. It is also optically analogous to the parallax barrier screen. Nowadays there are specific lens designs for animation, 3D and large formats and mass production techniques.

Conventional materials used for making a lenticular lens sheet are made as clear as possible while maintaining the ability to refract light. Higher transparency of the material is often desirable and in some applications such as printing, clearer and better visual effects can be realized with a high transmittance rate. The material should also be as stable enough to reduce thermally induced distortion so that a sheet of lenticular lenses can be used many contexts such being rolled for shipping or for use in printing presses. A lenticular sheet is usually made from acrylic, polycarbonate, polypropylene, PVC and polystyrene. The lenses may be arranged in an appropriate density, often commonly measured and expressed as lens per inch (LPI).

Typical embodiments of the arrangement of these lenses provides a V-shaped viewing region as depicted in FIG. 2 and discussed earlier. The image sensitivity to change in the position of the viewer depends on the viewing angle 204. A small viewing angle 204 makes the picture sensitive to change in that a viewer just needs to turn the head slightly and a different set of pictures will be seen. For wide angle lenses 204 the viewer can make a relatively bigger head turn to see a different set of pictures so the change is not so sensitive. As a result, narrow viewing angle lenses are suitable for three dimensional effects, and for dynamic prints.

The material used for making lenticular lens sheets are preferably stable, so that thermal distortion is reduced, while retaining flexibility so that it can be used in a printing press, and rolled for shipping.

Manufacture of Lens Sheets

Lenticular lens sheets are typically manufactured using machines or devices custom made for this purpose. One such device is described in published US patent application US2005/0286134A1 filed on Aug. 30, 2005, and entitled "Lenticular lens pattern-forming device for producing a web roll of lenticular lens", the contents of which are hereby incorporated by reference in their entirety. The published application describes a lenticular lens and method for manufacturing the lens, in particular as a lenticular lens web, such that finishing operations such as cutting, laminating and various end-use applications of the lens including labeling can be achieved or accommodated in-line with the manufacture of the lens web. The publication also discloses a lenticular pattern-forming device comprising a housing that is rotatable about a central longitudinal axis. The housing has an outer surface having a groove pattern. The groove pattern includes circumferentially and longitudinally extending grooves on the outer surface and the grooves have substantially equal groove widths. The longitudinally extending grooves are substantially parallel with the central longitudinal axis and grooves cover the outer surface of the housing. In addition, the invention further includes a method of using the lenticular pattern-forming device to produce a lenticular lens web, which can be used to make a lenticular image web. The image web can be used to create end products such as wallpaper, banners, labels and the like.

Some embodiments of the present invention, that will be described later, relate to the use of lenticular lens sheets to achieve improved camouflage. For example, one suitable type of a lenticular lens sheet has been described in U.S. Pat. No. 8,411,363 entitled "Plastic sheets with lenticular lens array", filed on Oct. 20, 2009, the contents of which are incorporated by reference herein. The patent discloses a lenticular sheet that includes a first surface having at least two portions, an opposing second surface, and a plurality of lenticular lenses formed in the first surface. Each portion of the first surface includes a number of lenticular lenses per centimeter that is different from the number of lenticular lenses per centimeter of an adjacent portion of the first surface.

There are several kinds of materials that may be used to make lenticular lens sheets. These include polyethylene terephthalate (PET) which is not amorphous and retains its crystallinity. PET has excellent clarity, good gas barrier properties, and good grease and solvent resistance. Polypropylene (PP) is also suited if the piece is to be finished die cutting lamination or fabrication. Polyvinyl chloride (PVC) which is made by combining ethylene produced by refining petroleum, with chlorine which is produced from rock salt, may also be used.

Specific applications and uses of various types of materials, methods of making such materials incorporating lenses, and articles of manufacture embodying such materials, exemplary of embodiments of the present invention, will be described.

Visual concealment and deception are useful in many contexts, such as hunting where decoys are often setup to attract either the same type of animal or a predator of the animal represented by the decoy. Often these decoys are life size in scale, which means the size of the decoy may be life sized version of a deer or elk. As such, physical decoys are difficult to get in and out of an area.

However, as the lens sheet material is nearly transparent the background colors allow it to blend into any environment in any season, day or night. The need to provide different large physical decoys is avoided as different images can be projected on to the display made of the lens sheet with practically unlimited choice of decoy images to display.

Using two lens sheets of opposing polarity can be used to create an image by way of interlacing as will be described below. Such techniques allow creation of standalone decoys with the projector broadcasting either a stationary decoy or a video of the decoy grazing.

For two sheets to have opposing polarities, if in the first sheet the arrangement of the lenses or lenticules is along a first particular direction, (e.g., horizontally or left-to-right), then in the second sheet having the opposing polarity, the lenses or lenticules would be disposed in a second direction at or about 90 degrees (perpendicularly) to the first direction (e.g., vertically or top-to-bottom).

One-Way Projection with Interlacing Effect

Figure 3:
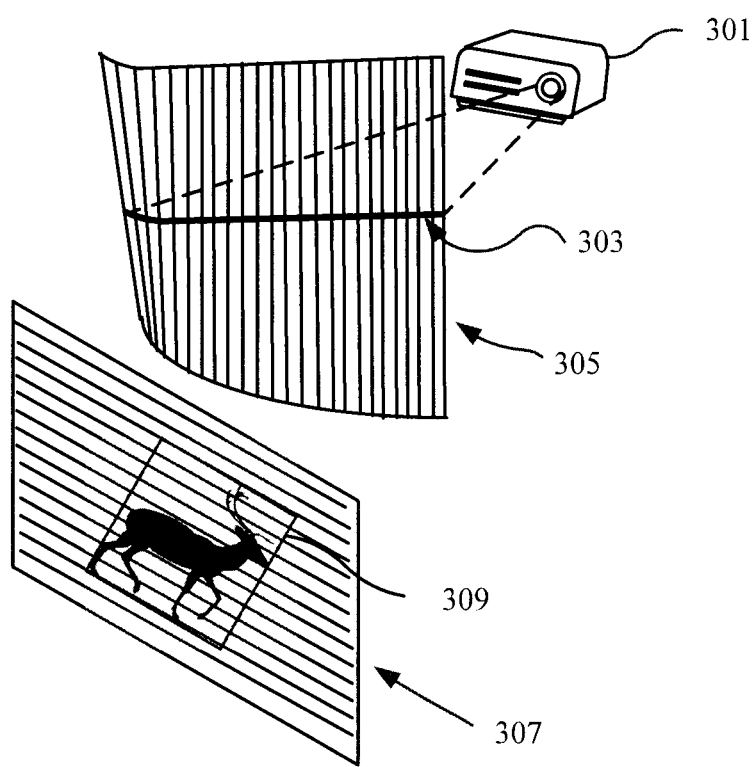
FIG. 3 is a schematic illustration of an embodiment having a vertically polarized sheet close to a projector, whereby the projected video image is perceived as a bright horizontal strip with a ghost image above and below.

FIG. 3 is a schematic illustration of an embodiment having a vertically polarized sheet 305 close to a projector 301, whereby the projected video image is perceived as a bright horizontal strip 303 and may contain ghost images above and below the strip 303. The vertical polarity of the sheet 305, leads to the horizontal alignment of the strip 303.

Adding a second a horizontally polarized sheet 307 such that the sheet 305 is between the projector 301 and the second sheet 307 as illustrated, allows the projected video image to be displayed correctly onto the second sheet 307.

The lenses in the second sheet 307 run in the opposite polarity (that is, horizontal polarity) thereby creating video image 309 on the second sheet 307 which remains translucent in areas where the image 309 is not projected. Using a black background to record the target or decoy, produces a translucent background around the image portrayed.

The first sheet 305 and second sheet 307 can be used on a riot shield. When used on a riot sheet, the body of an object holding the riot shield in place (such as a police officer, or a tripod holding the shield in an experimental setup) is hidden when behind the shield from the viewer. Moreover, the location of video image 309 on the shield is perspective dependent.

Projector 301 may be a large 2000 lumen or more projector or a handheld 200 lumen portable battery powered projector and similar effects are observed. Newer short-throw projectors with internal memory and battery power may thus be used to create a system that may be used by armed forces or the military where video images on shields display non-threatening portrayals of people or items, hiding one or more security personnel or soldiers behind.

In alternate embodiments, the exemplary material may be in front of a military vehicle and may be used to portray a common sports utility vehicle (SUV) or a farm vehicle or animal onto the material thereby deceiving the enemy.

In a variation of the above, a projector such as projector 301 may simply broadcast the image or video of a tank (e.g., M1 Abrams tank) or a soldier onto to create realistic decoys as will be illustrated later.

Another related application or embodiment, using any of the techniques above is to project a lenticular image or lenticular video onto the material matching one of the two polarities and frequency of that lens within the sheets, this would allow for standalone three dimensional images or videos onto one or more display sheets.

Figure 4:
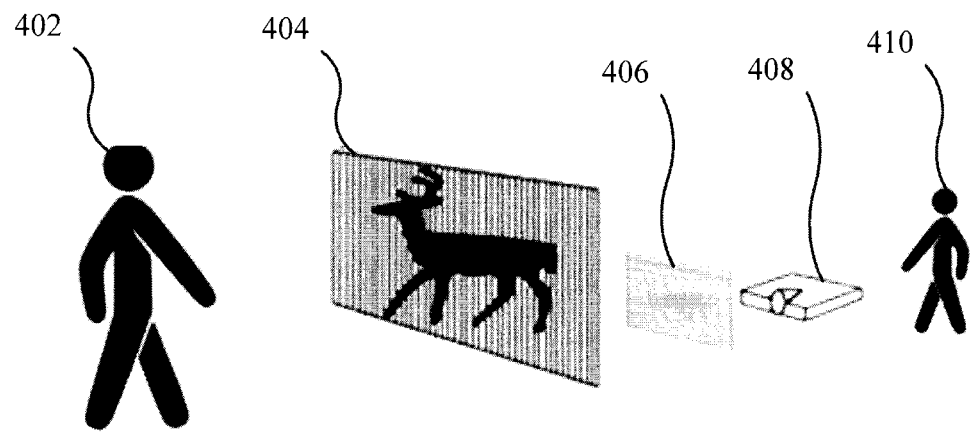
FIG. 4 is a schematic illustration of an embodiment having a first sheet closer to a projector, and a second sheet on which images are displayed.

In the embodiment shown in FIG. 4, a first viewer 402 and a second viewer 410 are on opposite sides of the projector 408. The first sheet 406 is closer to the projector 408 than the second sheet 404 on which the decoy image is presented. Both viewer 402 and viewer 410 would be able to see the decoy image on the second lens sheet 404. As shown the first lens sheet 406 and the second lens sheet 404 have opposite polarities.

Figure 5:
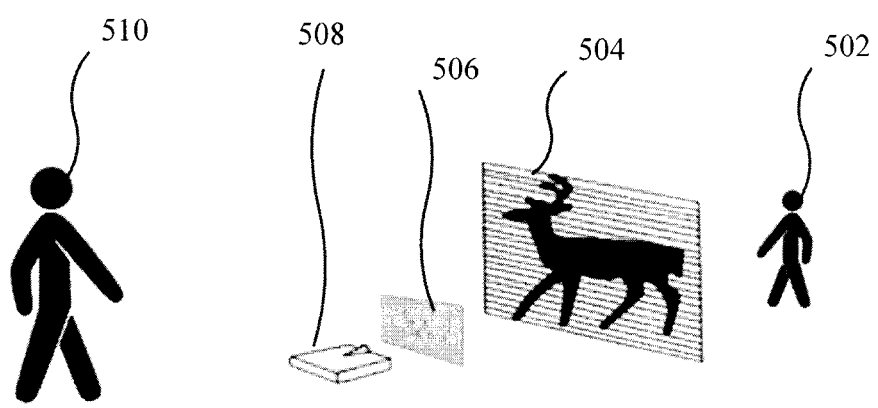
FIG. 5 is a schematic illustration of an embodiment having a first sheet closer to a projector, and a second sheet on which images are displayed.

FIG. 5 shows a similar embodiment slightly different from the embodiment shown in FIG. 4 with the polarities of corresponding lens sheets reversed. In FIG. 5 a first viewer 502 and a second viewer 510 are on opposites sides of the projector 508. The first sheet 506 is closer to the projector 508 than the second sheet 504 on which the decoy image is presented. Both viewer 502 and viewer 510 would be able to see the decoy image on the second sheet 504. Again, the first sheet 506 and the second sheet 504 have opposite polarities, as shown using vertical and horizontal parallel lines respectively.

Figure 6:
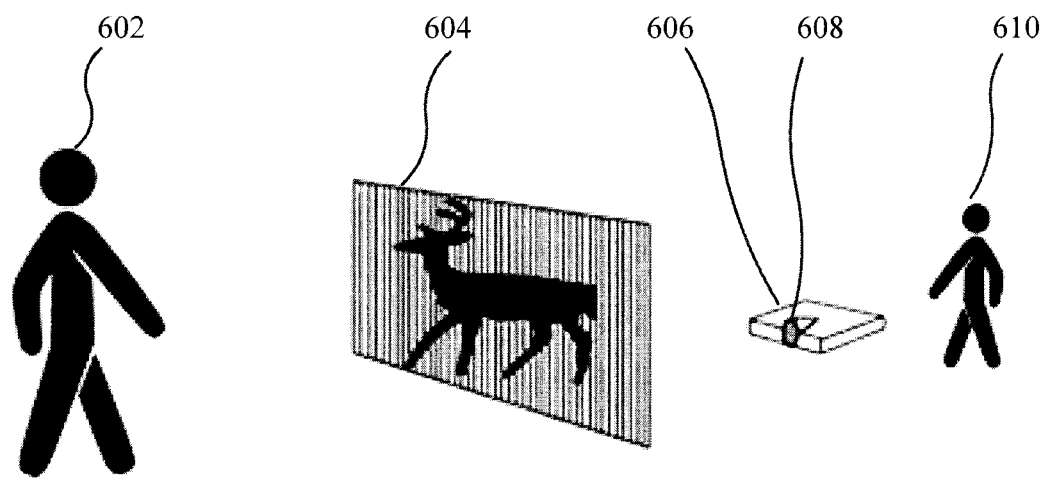
FIG. 6 is a diagram of an embodiment in which a decoy image is projected through a projector lens having a polarized lens opposite that of the display sheet.
Figure 7:
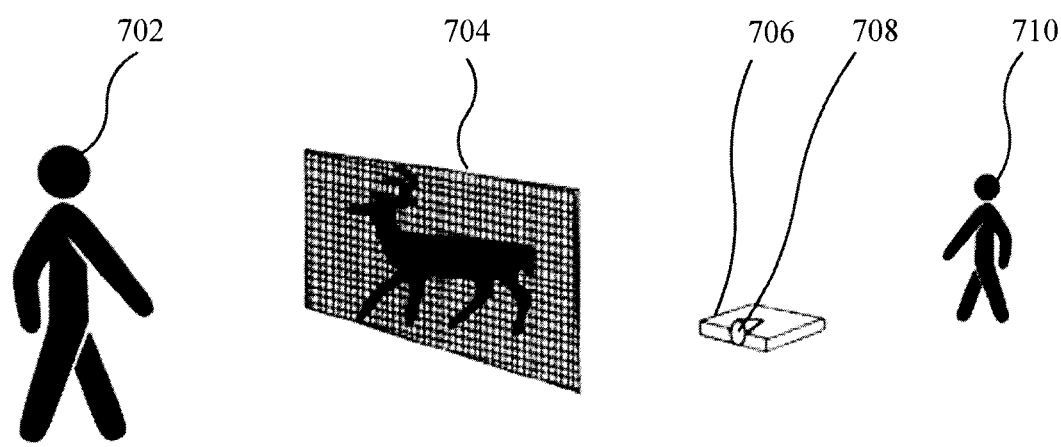
FIG. 7 is a diagram of an embodiment in which the decoy image is projected onto a display sheet having lenses on both sides, with opposite polarities.
Figure 8:
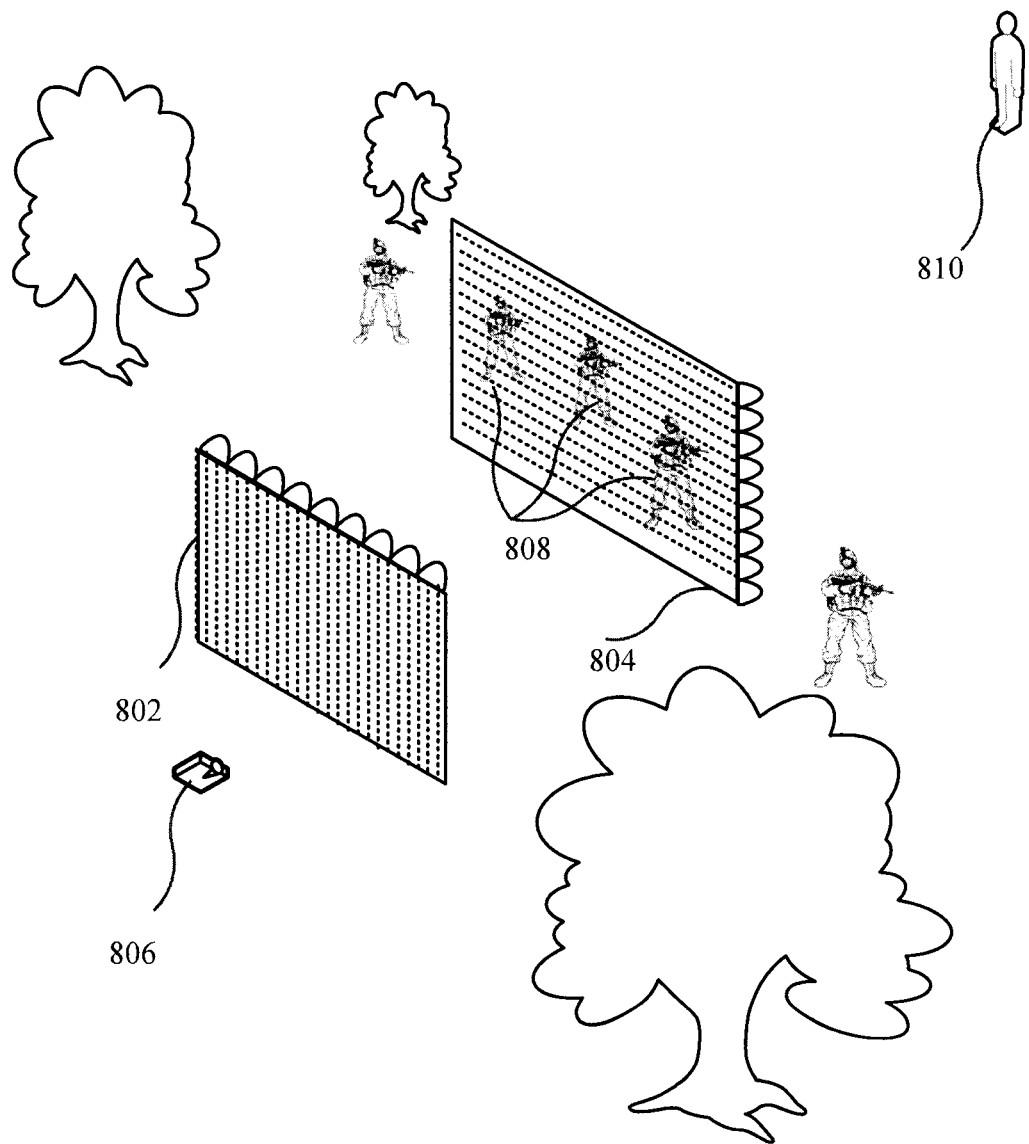
FIG. 8 is a schematic block diagram of two decoy sheets used to have decoy images projected thereon.
Figure 21:
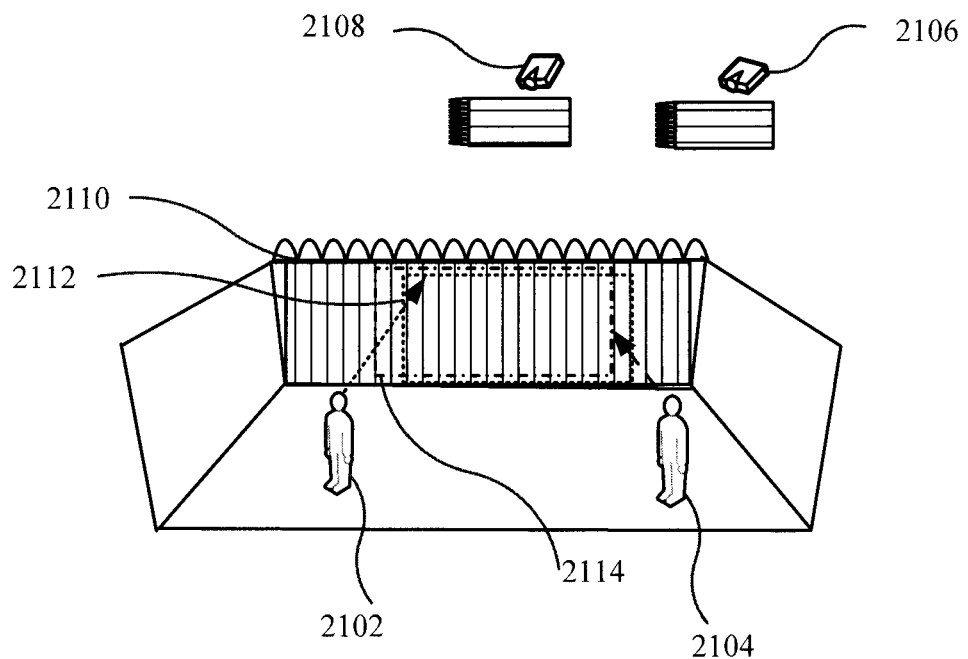
FIG. 21 is a schematic illustration of a virtual reality room, exemplary of an embodiment of the present invention, in which different users looking at the same wall, have different views.
Figure 22:
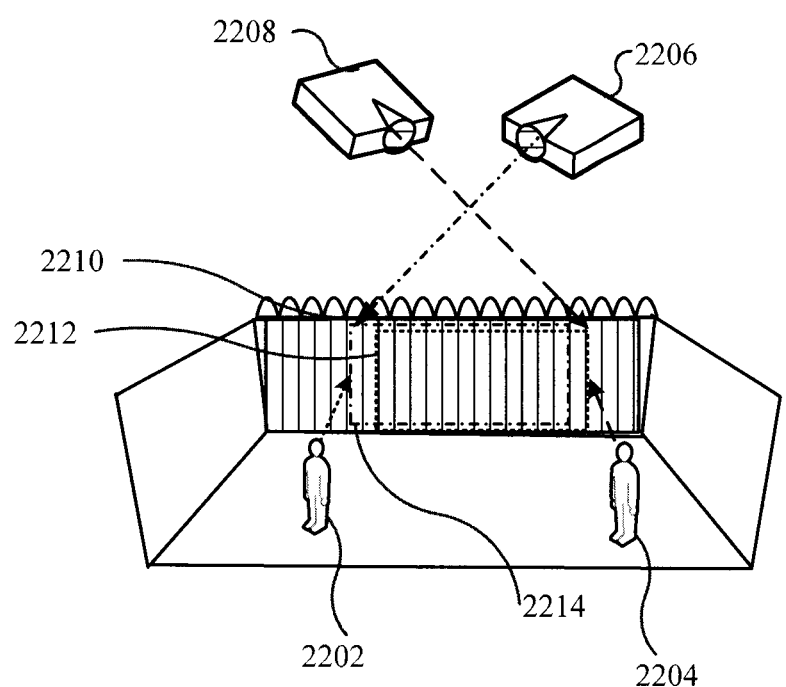
FIG. 22 is a schematic illustration of another virtual reality room, exemplary of an embodiment of the present invention, in which projectors have polarized lenses built into their respective projector lenses.

FIG. 4, FIG. 5, FIG. 6 to FIG. 7, FIG. 9, FIG. 10, FIG. 12 and FIG. 13 illustrate embodiments that can be used for decoys such as the embodiment illustrated in FIG. 8, and in displays as depicted in FIG. 21 and FIG. 22.

FIG. 6 depicts an embodiment in which the decoy image is projected through a projector lens having a polarized lenticular lens opposite that of the display sheet. A projector 606 having a projector lenticular lens 608 projects the decoy image onto a display sheet 604. A first viewer 602 and a second viewer 610 are on opposites sides of the projector 606. The display sheet 604 and the projector lens 608 have opposite polarities. In the depicted example, projector lens 608 has a horizontal polarization while the sheet 604 has a vertical polarization.

In a related alternate embodiment, the polarities may be reversed so that the lens 608 may have a vertical polarization while the sheet 604 may have a horizontal polarization. Both viewer 602 and viewer 610 would be able to see the decoy image.

FIG. 7 depicts an embodiment in which the decoy image is projected onto a display sheet having lenses on both sides but with opposite polarities. A projector 706 having a projector lens 708 projects the decoy image onto a display sheet 704. However, in this embodiment, the projector lens 708 does not have a polarized lens. A first viewer 702 and a second viewer 710 are on opposites sides of the projector 706. The display sheet 704 has lenses on both sides but with opposite polarities. Viewer 702 would be able to see the decoy image but viewer 710 may or may not be able to see the decoy image depending on the polarity and the viewing angle.

In embodiments having a second projector on the side of the viewer 702, if the image includes a background landscape and a decoy foreground image, the decoy image is only viewable on the opposite side i.e., by viewer 702, while the background landscape may be seen on both sides. On the side where the decoy image is visible the background can only be seen behind the decoy image, from a tight angle, whereas the background is visible on the opposite side (viewable by viewer 710) across a very wide angle but the decoy image is not visible on that side.

This visibility of an image from one projector on both sides only occurs when the two lens sheets of opposite polarity are in very close proximity to each other or touching.

Moreover, in embodiments having a second projector on the side of the viewer 702, visibility of an image from one projector on both sides further requires the polarity to be set up so that side showing the background only, has its lenses disposed vertically (up-down) whereas the side that shows both the decoy image and the background (within a tight viewing angle) has its lenses disposed horizontally (left-right).

Using this above techniques, a military soldier may place decoy soldiers around a defensive position to make adversaries perceive a larger force. If combat occurred the adversaries would have many more targets to select from thereby protecting the actual soldiers and if the decoy was hit the bullets would likely go right through the material and remain intact and the decoy would appear uninjured thereby drawing further fire away from the real soldiers.

A simplified embodiment of the above scenario is schematically illustrated in FIG. 8 which depicts two decoy sheets 802, 804. The decoy sheets 802, 804 are used respectively to have decoy images 808 of soldiers projected thereon from a projector 806, in order to create the illusion of a much larger force than is actually present.

While the image may be viewed on either the smooth or lens side of the material on the second sheet 804 that interlaces the image, better or even optimum results occur when viewing the image with the lens side facing the viewer 810 as shown. This could be improved with anti-reflective coatings on the smooth side and these anti-reflective coatings on the lens side may also improve results. The smooth side facing the projector is also perceived better if the viewer is on the side of the projector 806 as the smooth side helps reflect the image back towards the projector side.

The projector 806 can be on the side as the viewer 810 facing away from the viewer onto the material (such as one of decoy sheets 802, 804) which is further away from the viewer in relation to the projector 806. The material on sheet 804 closest to the projector 806 would have to be shorter than sheet 802 to allow the viewer 810 to see over sheet 804 and see the decoys on sheet 802.

Improvements of having lenses manufactured with the opposite polarity being on both sides of each sheet so there is no smooth side on either sheet—that is, the first sheet would have lenses on both sides running up and down whereas the second sheet would be opposite of the first sheet with lenses on both sides running left to right. These polarities are interchangeable between the two sheets as long as they are opposite from one another.

Using larger decoy sheet material, images of larger objects such as armored vehicles and tanks may be broadcast. The larger decoy sheet material may be attached to a small golf cart. Alternately, the larger material may be attached to balloons in order to broadcast images of an attack helicopter.

Placing very large decoy sheets around an installation would provide for a large static or moving display of vehicles, soldiers and aircraft which may deceive an enemy into believing that there is a much larger defensive or offensive force around the installation, with minimal cost to create and operate these decoys.

Other exemplary embodiments involve a curved set of lenses, shaped like a cylinder, having lenses on one or both sides. In one specific embodiment, on the side of the cylinder facing the projector the lenses are arranged in a first polarity while on the opposite side the lenses are arranged with an opposite polarity to the first set of lenses. This creates an element of depth, being able to see part of the image on the right side of the curve and as viewer moves around to the left side, the viewer can then view that part of the image could not be seen from the right. Both lenses may be curved in the same direction or the first lens may be flat as will be described in detail below. The curve may be concave such as on new televisions and IMAX screens which helps reduce reflections on the screen having lenses.

In a related embodiment, lenses of opposite polarity are manufactured into the same piece of material so one side of the material the lens runs up down and the other side lens runs right to left. No other lenses are needed to attain an image interlaced onto this combined lens material nor is any distortion required to fix the image or video on the material as there is no separation between the two lenses to allow for distortion. This single piece of material may be manufactured as a flat sheet, curved or in any geometric shape providing a projection screen that may have a number of curved or angled viewable surfaces such as a cube or pyramid. More than one projector may be required to project onto surfaces of a shaped screen to provide an image or video over a partial shape of the material or over the complete shape of the material.

Irregularly Shaped of Lens Sheets

Figure 9:
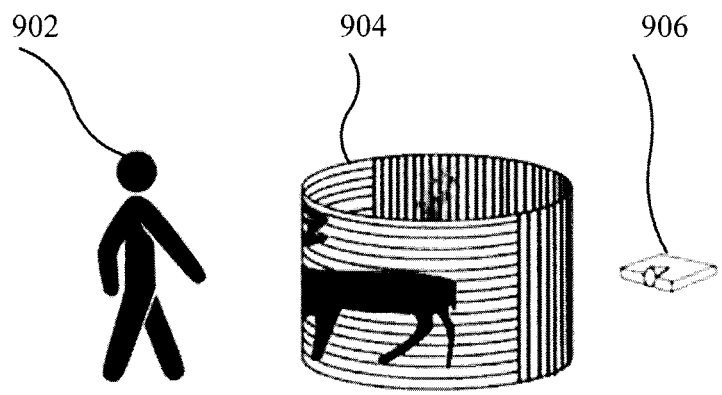
FIG. 9 depicts an embodiment in which an image is projected on curved set of lenses, shaped like a half cylinder.

FIG. 9 depicts an embodiment in which an image, which may be a decoy image, is projected on curved set of lenses, shaped like a cylinder. A projector 906 projects the image onto a cylindrical display sheet 904 which has a front half that is polarized opposite the back half as shown. In the depicted embodiment, the front half is horizontally polarized while the back half on which the projected projects in the image initially is vertically polarized. A viewer 902 views the image formed on the front half of the cylindrical display sheet 904.

Figure 10:
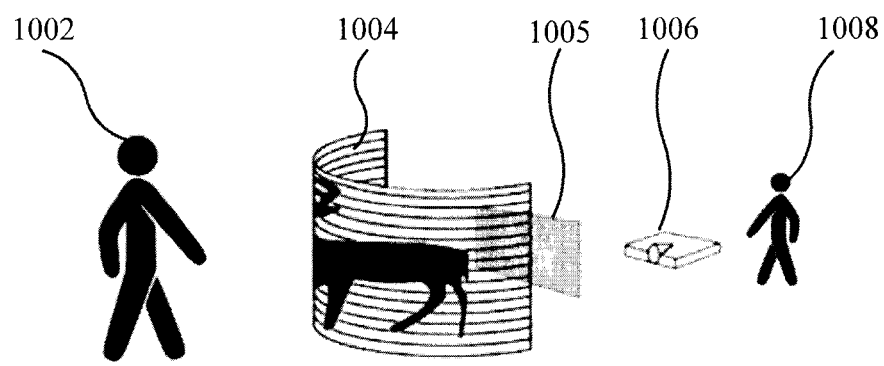
FIG. 10 depicts another embodiment in which an image is projected on curved set of lenses, shaped like a half cylinder.

FIG. 10 depicts an embodiment in which an image, which may be a decoy image, is projected on curved set of lenses, shaped like a half cylinder. A projector 1006 projects the image onto a half cylindrical display sheet 1004 whose lenses are polarized opposite that of a second sheet 1005 that is closer to the projector 1006 as shown. Although in FIG. 10 a flat second sheet 1005 is shown, in other embodiments, sheet 1005 may be curved as well. A first viewer 1002 views the image formed on the front half of the cylindrical display sheet 1004. A second viewer 1008 also sees the same image formed the half-cylindrical display sheet 1004 if sheet 1005 does not obstruct viewer 1008 from viewing sheet 1004.

Figure 11:
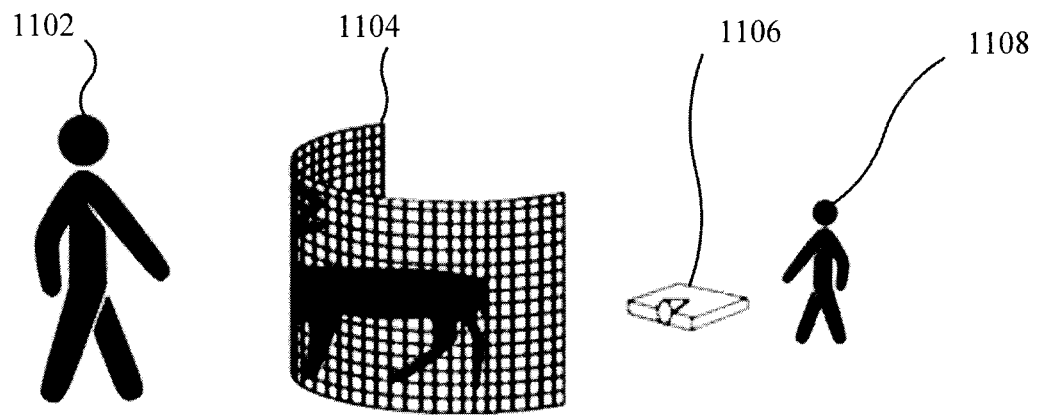
FIG. 11 depicts another embodiment in which an image is projected on curved set of lenses, shaped like a half cylinder.

FIG. 11 depicts another embodiment in which an image, which may be a decoy image, is projected on curved set of lenses, shaped like a half cylinder. A projector 1106 projects the image onto a half cylindrical display sheet 1104 which is formed by placing two half cylindrical display sheets together whose lenses are polarized opposite one another as shown by the vertical and horizontal lines.

A first viewer 1102 views the image formed on the outer side of the half cylindrical display sheet 1104. A second viewer 1108 also sees the same image on the inner side of the half-cylindrical display sheet 1104. As noted earlier with reference to FIG. 7, visibility of an image having a background and a decoy foreground, from a single projector, on both sides of display sheet 1104 only occurs when the two lens sheets making up display sheet 1104 are of opposite polarity and in very close proximity to each other or touching. Moreover, in embodiments having a second projector on the side of the viewer, visibility of an image from one projector on both sides further requires the polarity to be set up so that side showing the background only, has its lenses disposed vertically (up-down) whereas the side that shows both the decoy image and the background (within a tight viewing angle) has its lenses disposed horizontally (left-right).

Figure 12:
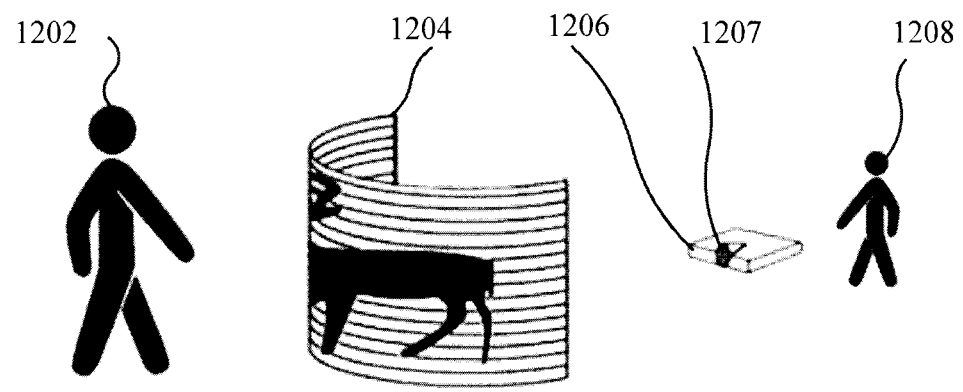
FIG. 12 depicts yet another embodiment in which an image is projected on curved set of lenses, shaped like a half cylinder.

FIG. 12 depicts another embodiment in which an image, which may be a decoy image, is projected on a curved lens sheet made up of a set of curved lenses, shaped like a half cylinder. A projector 1206 having a polarized projector lenticular lens 1207 projects the image onto a cylindrical display sheet 1204.

The lenses on display sheet 1204 and the projector lenticular lens 1207 have opposite polarities. A first viewer 1202 views the image formed on the front half of the cylindrical display sheet 1204. A second viewer 1208 also sees the same image formed on the half-cylindrical display sheet 1204.

In alternate embodiments, that will be discussed below, displays may be shaped differently and may even have a three dimensional configurations having multiple display surfaces.

Figure 13:
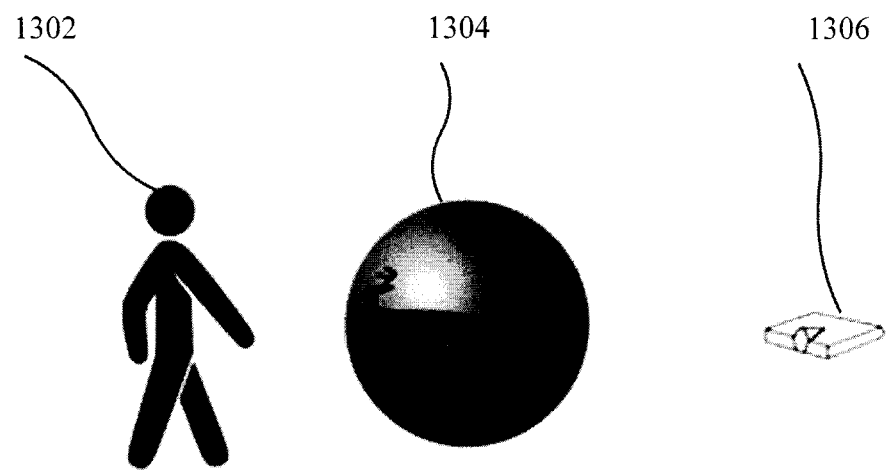
FIG. 13 depicts a schematic illustration of an embodiment in which an image projected on to a spherical display.

FIG. 13 depicts a schematic illustration of an exemplary embodiment in which a viewer 1302 views an image projected on to a spherical display 1304 from a projector 1306. The viewer 1302 is on one side of the spherical display 1304 while the projector 1306 is on the opposite side of the projector 1306 as shown. The back hemisphere of the spherical display 1304 facing the projector 1306 or at least a portion thereof, would have the opposite polarity of the front hemisphere (or at least a portion thereof) of display 1304 where the image appears.

Figure 14:
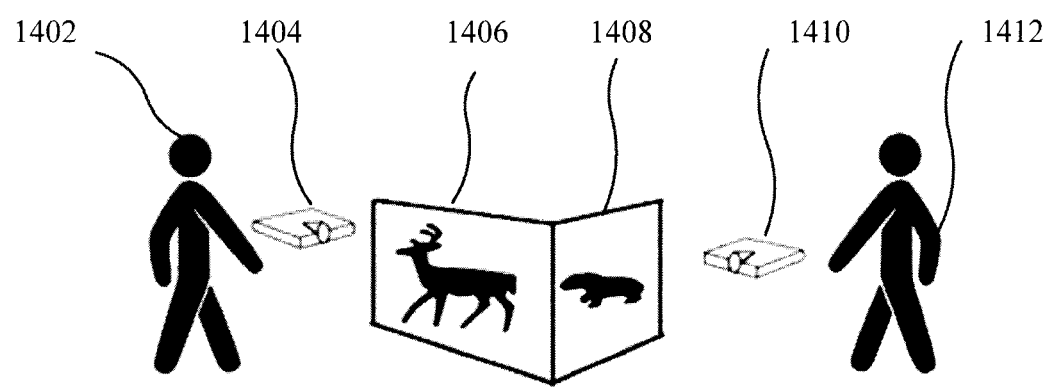
FIG. 14 is a schematic illustration of an embodiment in which the display includes multiple surfaces used to display different images, viewable from different vantage points.

FIG. 14 depicts a schematic illustration of another embodiment in which multiple projectors are involved, and viewers view different images depending on their vantage point. A first viewer 1402 views an image projected on to a display surface 1406 from a first projector 1410. A second viewer 1412 views another image projected on to another display surface 1408 from a second projector 1404. There would be lens material in between projector 1404 and display surface 1408 of the opposite polarity of display surface 1408. Similarly there would be lens material between projector 1410 and display surface 1406 of the opposite polarity of display surface 1406. Alternately the lenses of the projectors would have lenticular lenses of the opposite polarity so that the projector lenticular lens polarity on projector 1404 would be opposite of display surface 1408 and the projector lenticular lens polarity on projector 1410 would be opposite of display surface 1406.

Figure 15:
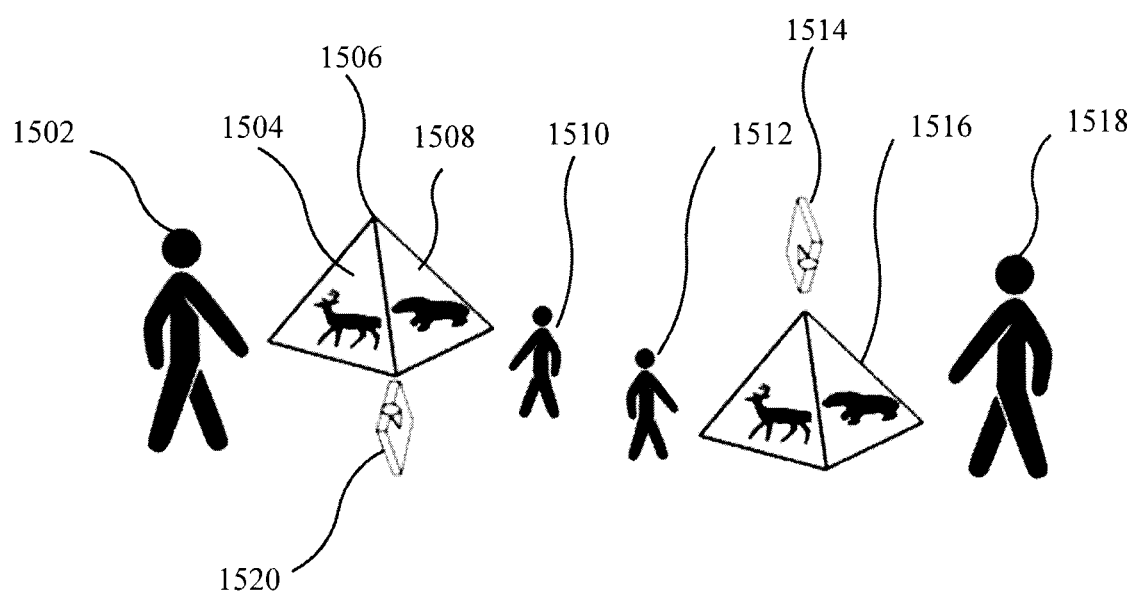
FIG. 15 is a schematic illustration of an embodiment in which the display includes multiple surfaces used to display different images, viewable from different vantage points.

FIG. 15 depicts a schematic illustration of yet another embodiment in which images or video are displayed on numerous sides of displays. One or more projectors 1520, 1514 can be used. Projector 1520 projects images on to display 1506. Different sides of display 1506 such as side 1504 and side 1508 can display different images. Display 1506 may be polyhedron in shape in general, and a tetrahedron in particular as shown. Projector 1514 projects images on to display 1516. Different sides of display 1516 can display different images as shown. Viewers 1502, 1510, and viewers 1512, 1518 can see images in their fields of view projected on display 1506 and display 1516 respectively. As would be appreciated, there is lens sheet material (not shown) of opposite polarity between the projector and the surface where images are portrayed. Alternately, the lenses of the projectors would have lenticular lenses of the opposite polarity as described just above.

Figure 16:
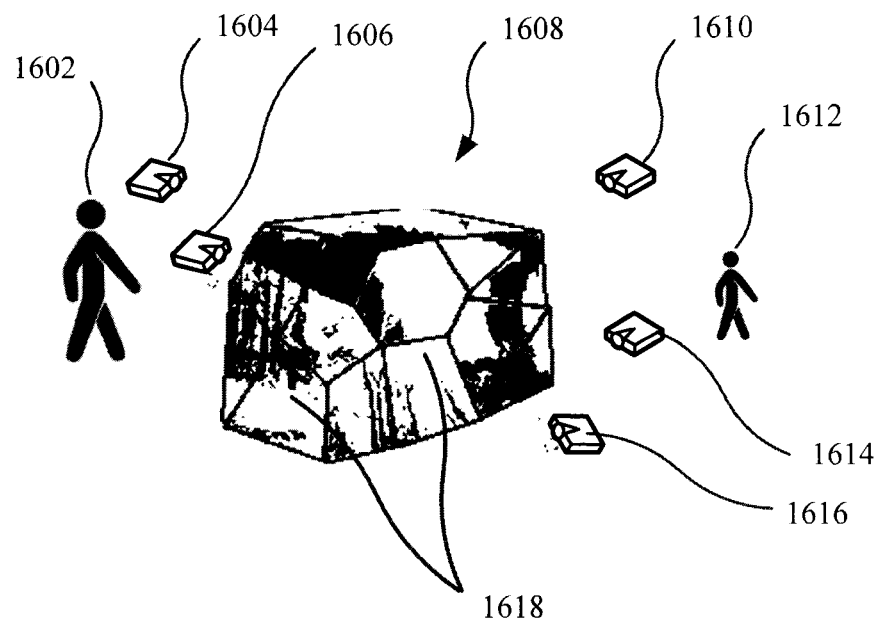
FIG. 16 is a schematic illustration of an embodiment in which the display includes multiple surfaces used to display different images, viewable from different vantage points.

FIG. 16 depicts a display with a complex shape in which multiple projectors are used with many potential applications in advertising, art, architecture and the like. An exemplary complex display 1608 displays images projected under, over or from the side of its surfaces. Display 1608 may be polyhedron in shape. The projections may also emanate from within the display 1608. Viewers 1602, 1612 are thus able to see a variety of images on the many surfaces 1618 of display 1608, as projected by projectors 1604, 1606, 1610, 1614 and 1616. Again, the skilled reader would appreciate that there is lens sheet material (not shown) of opposite polarity between the projector and the surface where images are portrayed. Alternately, the lenses of the projectors would have lenticular lenses of the opposite polarity as described above with reference of FIG. 15.

Two-Way Projection Display Systems

Figure 17:
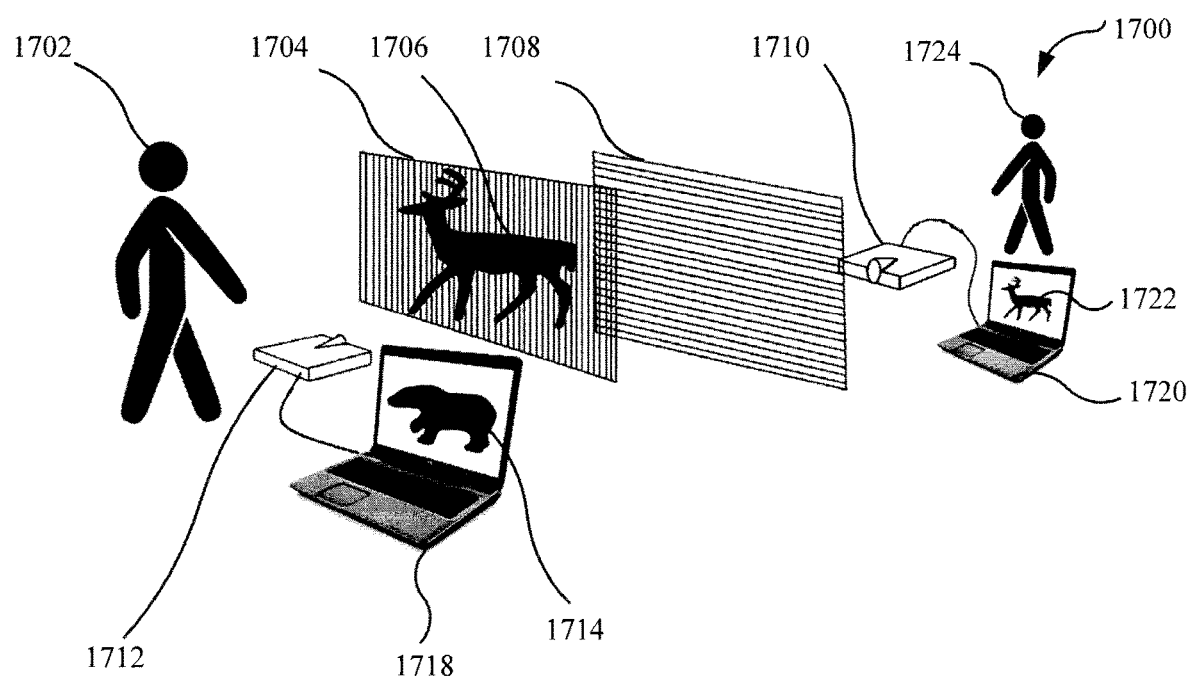
FIG. 17 is a schematic illustration of an embodiment of a display system having two projectors placed a fixed distance apart, the display system further including two lens sheets of opposite polarities are disposed therebetween.
Figure 18:
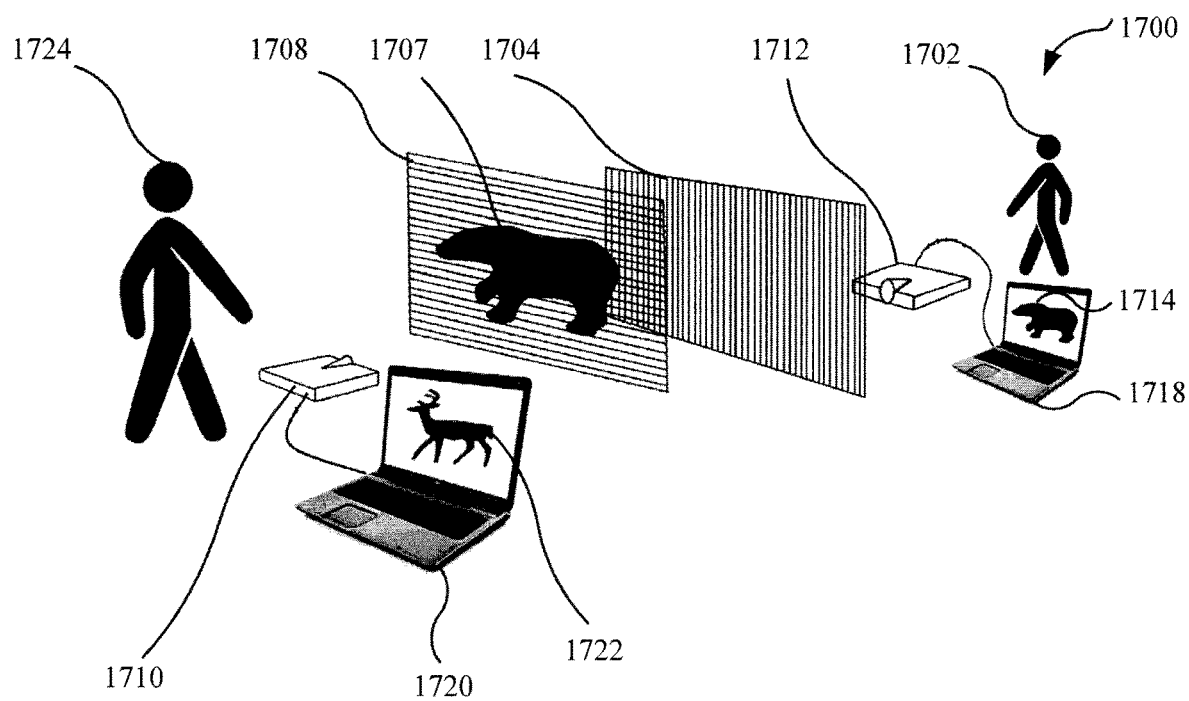
FIG. 18 is a schematic illustration of another embodiment of a display system having two projectors placed a fixed distance apart, the display system further including two lens sheets of opposite polarities are disposed therebetween.

In another exemplary embodiment illustrated in FIG. 17 and FIG. 18, a display system with two projectors disposed a first fixed distance apart, to face each other project their respective images towards one another. Two lens sheets having opposite polarities are disposed, a second fixed length apart between the projectors. The second length is shorter than the first length as the lens sheets would be disposed in between the projectors.

In the specific embodiment of a display system 1700 depicted in FIG. 17 and FIG. 18, a projector 1712 connected to a computer 1718 and another projector 1710 connected to another computer 1720 are placed facing each other about 12 feet apart. This distance can be varied and the specific distance of twelve (12) feet noted above is only exemplary. A first lens sheet 1704 and a second lens sheet 1708 having their respective lenses arranged in opposite polarities are placed in between the two projectors 1712, 1710 about two (2) feet apart from each other. This distance can be varied and the specific distance of two (2) feet noted above is only exemplary.

In operation, as shown in FIG. 17, when projecting the image 1722 from computer 1720 using the projector 1710, the projected image 1706 would first go through lens sheet 1708 closest to projector 1710 and interlace onto lens sheet 1704 as shown.

Simultaneously, as shown in FIG. 18, when projecting image 1714 from computer 1718 using the projector 1712, the projected image 1707 would first go through lens sheet 1704 that is closest to projector 1712 to interlace onto the farther lens sheet 1708 as shown.

As may be appreciated, in the specific depicted arrangement, a user 1702 in FIG. 17 would be able to see the image on lens sheet 1704 but not the same image 1706 on lens sheet 1708. Similarly, a user 1724 in FIG. 18 would be able to see the image 1707 on lens sheet 1708 but not the same image on lens sheet 1704.

An interesting application of the above embodiment as depicted in FIG. 17 and FIG. 18 is simultaneous video broadcasting. Video sequences or movies projected would behave in the same manner as the images, i.e., user 1702 would be able to see a video sequence projected on lens sheet 1704 but user 1702 would not be able to see the video on lens sheet 1708 from where he or she is positioned. Similarly, user 1724 would be able to see the video projected and interlaced on lens sheet 1708 but will not see the video sequence on lens sheet 1704 from where he is she is positioned or situated.

It was found by the inventor of the present invention that when lens sheets are placed two (2) feet apart, if a viewer changed his or her viewing angle or perspective, the image would shift on the lens sheet providing an element of depth that was specific to the viewer. The shifted image viewed would be different for a second viewer and similarly again different for each person on that same side of the lens sheet. This effect was more apparent when the image or video was on the horizontal polarity. The second motion picture or movie playing on the opposite side in the vertical polarity was slightly different as there was more perceived movement up and down in relation to the viewers distance changing between the viewer and the lens—i.e., as the viewer got closer, the image would move up on the lens in relation to the viewer's distance.

The above finding provides a new use for embodiment of FIG. 17 and FIG. 18 and confirms the holodeck application of the embodiments of FIG. 21 or FIG. 22 that illustrate immersive experience room for multiple people providing different perspectives for each.

The element of depth and perspective comes about from the two lens sheets 1704, 1708 of opposing polarity having some gap or distance between them (e.g., two feet). This is also true of one projector broadcasting through both lens sheets set apart from each other (gap of inches or feet)—the greater the gap between the lenses the more movement occurs with a viewer's changing perspective.

When the two lens sheets are held together, the image had no movement change when based on the viewers' perspective. Further, when using two projectors from either side each lens would show a ghost image from the closest projector over the image or movie from the second.

Tighter configurations of lenses on a lens sheet, which may have different angles, such as in cylindrically shaped sheet 904 in FIG. 9, increases the clarity and viewing angle of the video and reduces the bands of light and prism (rainbow) effect which are seen when a larger configuration of lenses is used.

Display Systems with Mirrors

Figure 19:
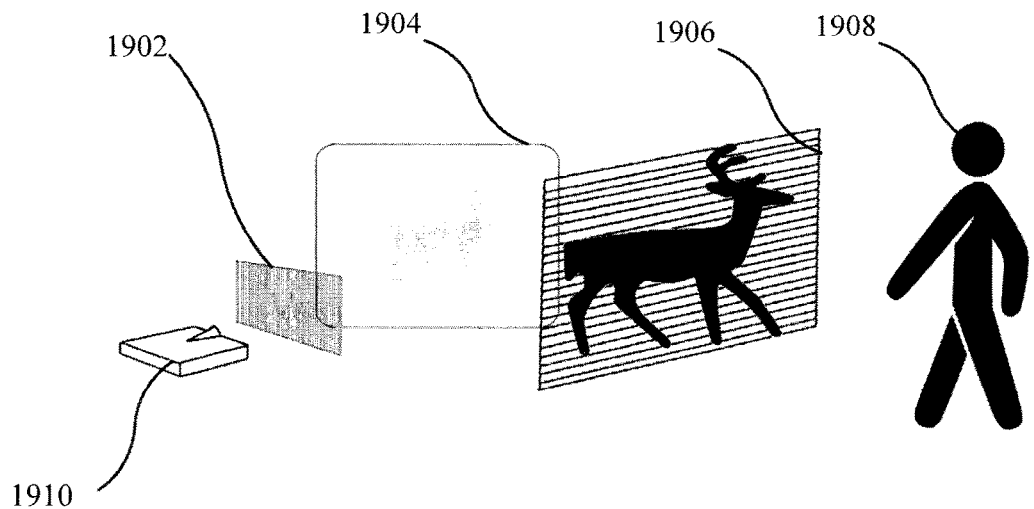
FIG. 19 is a schematic illustration of a variation of the embodiment of FIG. 4 further utilizing a mirror.

Another display system, exemplary of an embodiment of the present invention, is depicted in FIG. 19. The display system includes a projector 1910 and a mirror 1904 disposed between a first lens sheet 1902 and a second lens sheet 1906. This arrangement allows for more compact display system housing all the components. Such an arrangement permits components behind lens sheet 1902 such as projector 1910 to be hidden from the viewer 1908 (around a corner).

Lens sheet 1902 and projector 1910 may be substituted with a projector having a projector lens or projector lens cover thereon. As will be appreciated by a person of skill in the art, the projector lens or cover would have a polarity opposite that of lens sheet 1906 so as to permit interlacing of the projected sub-images. The lens sheet 1906 may also utilize different geometric shapes as discussed in relation to earlier described embodiments.

In the above embodiment, a distortion of the aspect ratio may be observed on the displayed image on lens sheet 1906, when a video image is projected from projector 1910. This may be due to the distance between the two materials with the mirror bounce creating a larger distance. To correct such distortions, horizontal and vertical ratio of the video being projected may be changed as will be described later.

Figure 20:
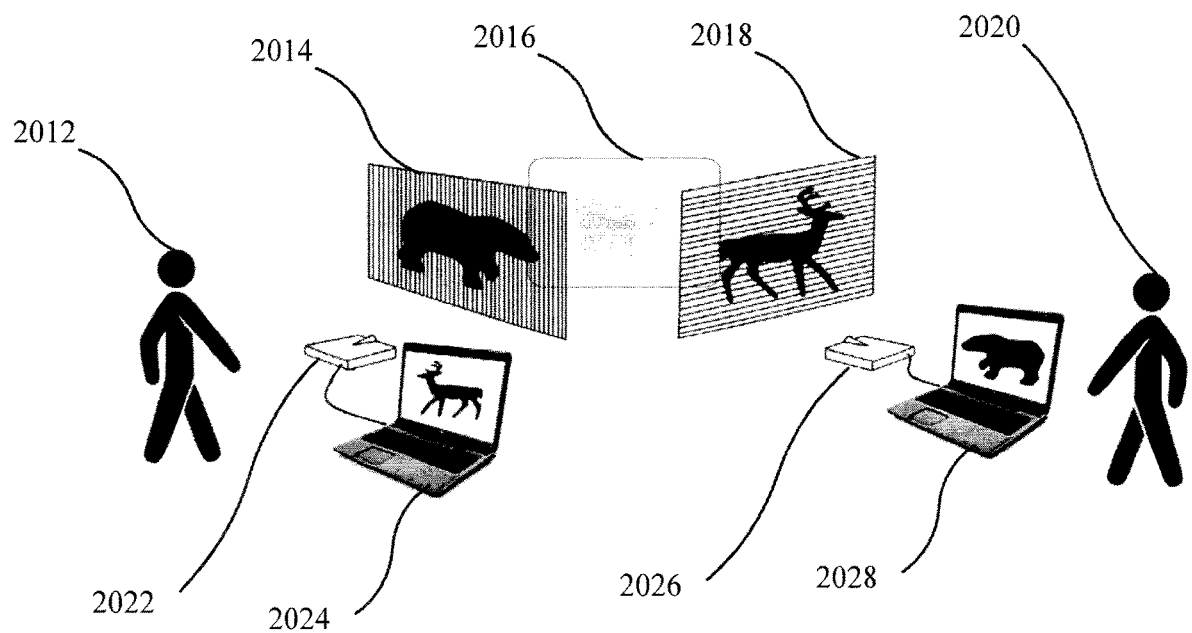
FIG. 20 is a schematic illustrations of a variation of the embodiment of FIG. 17 or FIG. 18 further utilizing a mirror.

In yet another variant, exemplary of another embodiment of the present invention, a display system as depicted in FIG. 20 uses a plurality of projectors 2022, 2026 connected to corresponding image sources 2024, 2028 respectively, and a mirror 2016 in between a lens sheet 2014 and lens sheet 2018. This allows for dual viewing in a manner similar to the embodiment of FIG. 17 and FIG. 18.

Viewer 2012 sees the image or video from projector 2026 without seeing the image from projector 2022 while viewer 2020 sees the image or video from projector 2022 without seeing the image from projector 2026. As may now be will be will be appreciated by those skilled in the art, the lens sheet 2014 and the lens sheet 2018 have opposite polarities.

Perspective Dependent Views, Holodeck and Immersion

Another exemplary embodiment of the present invention involves immersive virtual reality (VR) systems that are known to allow users to interact in virtual environments, where presence is limited to the virtual world. Movies and scientific literature have suggested several VR interfaces that enhance presence of users in a virtual environment (VE), for example, the holodeck on the popular television series Star Trek™. Some of these immersive environments inspired research into displays where the user cannot tell real from virtual.

In embodiments of the present invention, as a viewer moves, the image or video on a lens sheet display changes, but based solely on the location of the viewer relative to the lens sheet display.

Companies such as Microsoft are working on a Holodeck type room to immerse someone into a simulated environment within the room providing video on the walls that are projected with the correct perspective for the viewer's location within that environment. Typical approaches are geared towards a first person, assumed to be a single user, whose head is tracked by a camera and the images or video are moved or spatially translated in relation to the head of the subject person to retain the correct perspective. In other words, a video camera tracks the first person's head and modifies the environment for the correct perspective of this viewer.

While this allows the first person to attain the correct perspective, any other persons in the room that are not near the first person would get an unrealistic perspective. The perspective of other persons would be off or incorrect if the other persons are not near the first person.

Exemplary of embodiments of the present invention do not track the viewer. Rather, it is a property of the lens sheet material that, when utilized in the manner as depicted and described herein, provides different perspectives depending on the location of the viewer. Tracking of the user's movements is avoided, in sharp contrast to existing VR systems. One of the most intuitive ways of moving through such a scenario as well as through our real world is to perform real walking.

This is important in creating realistic looking 3D objects, holographic like displays or virtual or augmented reality.

Using materials exemplary of embodiments of the present invention, such as lenticular lens sheets as described above, in a virtual reality room, and broadcasting from the other side of the wall from the observers with numerous projectors providing unique perspectives which can only be seen from particular observation points, multiple users could experience the same virtual reality environment without a camera tracking one user. The projectors may also be inside the room, for example, on the roof or suspended above the people or in other areas within the room. The projectors broadcast images onto the lens material placed on or in front of the walls which may be transparent, translucent or solid walls. If the walls are transparent then the projectors may be placed behind the walls.

Each user would have a perspective dependent view that depends on the viewers physical location and orientation which changes as each user moves move through the room due to the nature of the lenticular lens that allows them to create 3D images, and the many different projectors of the scene.

This is depicted in FIG. 21. The virtual reality room in FIG. 21 depicts different users 2102, 2104 looking at the same wall 2110 made of a lenticular lens sheet. Projectors 2106, 2108 project or broadcast on to the wall of the virtual reality room. The user 2102 views the image 2112, while user 2104 views the image 2114 on the same wall 2110. Image 2112 and image 2114 may be perceived as 3D images.

In FIG. 21 the projectors 2106, 2108 could be behind transparent wall 2110 with a lens sheet in front of the projectors and second lens sheet of the opposite polarity on the wall 2110 as shown. The transparent wall 2110 may be made of glass or Plexiglas. The projectors 2106, 2108 may also be arranged within the room with a lens in front of the projector and a second lens of the opposite polarity on the wall which is either transparent, translucent or solid. Mirror bounce techniques could also be used as described previously for FIG. 19 and FIG. 20.

New projectors may be developed for the display system as shown in FIG. 22. As illustrated FIG. 22 depicts different users 2202, 2204 looking at transparent or semitransparent wall 2210 made of a lenticular lens sheet. Projectors 2206, 2208 project or broadcast on to the wall 2210 of the virtual reality room. The user 2202 views the image 2214, while user 2204 views the image 2212 on the same wall 2210. These new projectors 2206, 2208 have polarized lenticular lenses built into their respective projector lens thereby removing the need for the first sheet to be placed in front of the projector, thus allowing for the projector to transmit the image or video directly onto the second sheet in the form of wall 2210 having the opposite polarity. An improvement may be to have the second sheet with the same polarity of lenses manufactured on both sides of the sheet or placing two sheets together with the same polarity. Mirror bounce techniques could also be used as described previously for FIG. 19 and FIG. 20.

In experiments, using different size lenses between the first lens and the second of the opposite polarity still functioned. However the larger lens polarization if used on the first lens closest to the projector could be perceived on the second lens if the lenses were close to each other.

In an alternate exemplary embodiment, two lenses of opposite polarity are placed close together or on top of one another to create a translucent screen for either forward or rear projection which can be viewed on either side.

Figure 23:
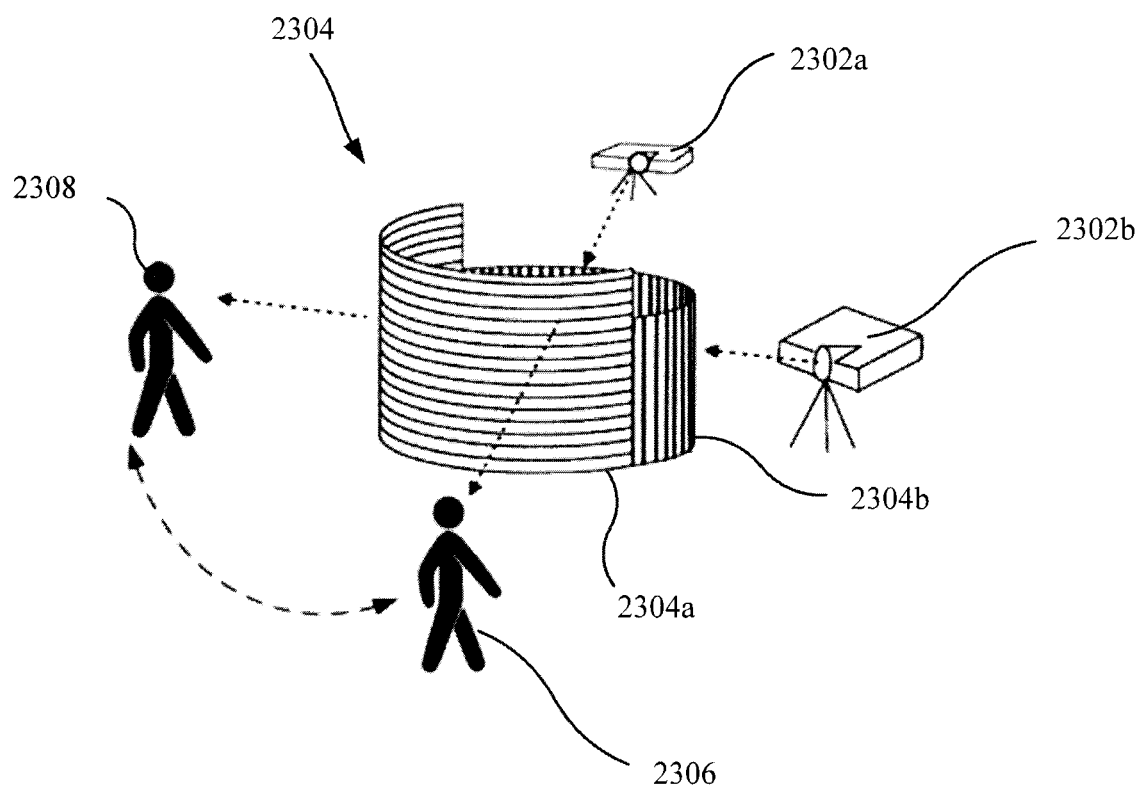
FIG. 23 is a schematic illustration of display system having a cylinder configuration to display two different images viewable in a perspective dependent manner.

In one exemplary embodiment illustrated in FIG. 23, a cylinder configuration to display two different images or video streams of the front left and front right side on the same lenticular lens sheet 2304a. A pair of projectors 2302a, 2302b which may be the smaller 200 lumen portable projectors are used. A first viewer 2306 and a second viewer 2308 view different images or videos as they are at different locations relative to the cylindrical display 2304 having a first lens sheet 2304a and a second cylindrical sheet 2304b. The two lens sheets 2304a, 2304b have opposite polarizations. The lens sheet 2304b first receives the projected image from the projectors 2302a, 2302b which are then interlaced onto lens sheet 2304a. Viewer 2306 sees the image or video projected from projector 2302a and viewer 2308 sees the image or video projected from projector 2302b.

The embodiment demonstrates that as a viewer moved from one side of the cylinder to the other that you would see the two different views. The same image or movie may be shown on both the left side and right side but with the correct perspective for the viewer such as seeing the left side of a person on the left side and the right side of the same person on the right side leading to a simulated three dimensional effect. This technique of using two or more projectors to create multiple perspectives that are viewer location dependent also works on non-curved (flat) lenses.

Photographs with a flat black backdrop show that when projected, black background does not show up on the material or sheet 2304a. This aspect is important when simulating a decoy onto the material such as a soldier, the background does not give away that it is a decoy.

It is to be noted that projected images on lens sheets 2304a, are above the lower piece of the light bending material in behind (the sheet 2304b closest to the projectors 2302a, 2302b). Once this feature is pointed out, it becomes very confusing for a viewer to understand the optical principles involved, which adds to the Sci-Fi holographic display effect people have hoped for.

The two projectors 2302a, 2302b are both from the same manufacturer. Projector 2302b includes a short throw lens allowing it to be much closer to the material on sheet 2304b in order to provide the same size image as projector 2302a.

In a slight variation of the embodiment depicted in FIG. 23, only one projector may be used with one image of a person taken from the front, to simulate the holographic effect without the need for multiple projectors. While the image viewed is static, the movement of the viewer and the way the image follows the viewer on the material as the viewer moves left to right (more so when on the horizontally polarized lens sheet) or closer and farther (more so when on the vertically polarized lens sheet) makes it appear like a three dimensional (3D) object.

Figure 24:
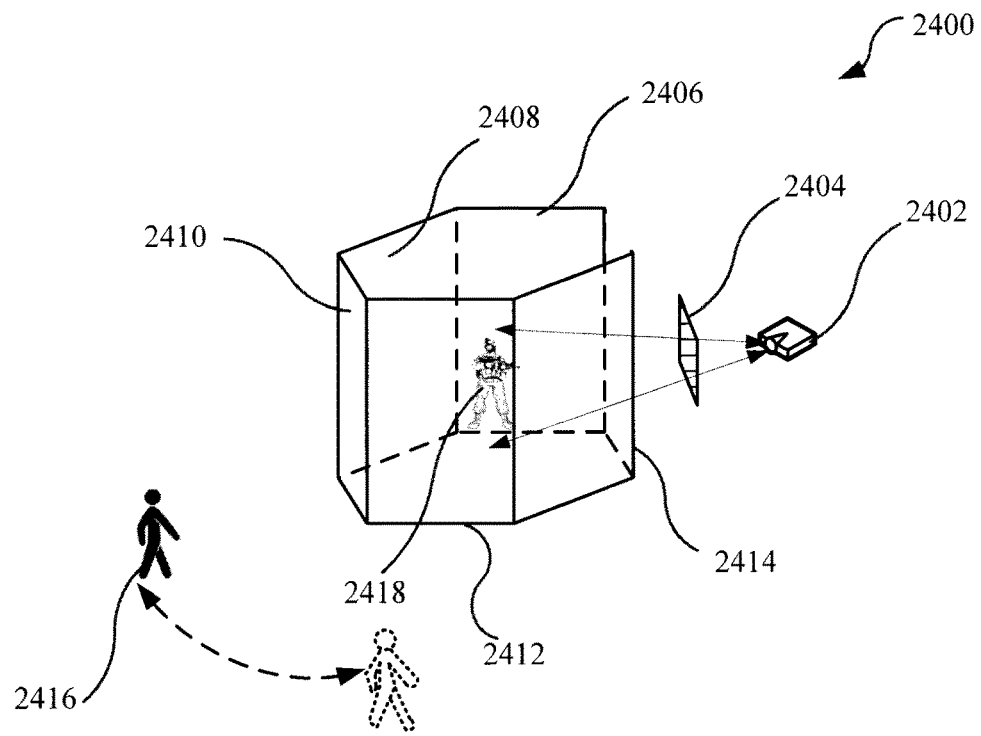
FIG. 24 is a schematic diagram a display system for simulating a 3D object at a location, by exploiting perspective dependent views of lens sheets arranged to enclose the space.

Multiple large pieces of the lens sheet material may be used to create life sized rendering of images. For example, FIG. 24 depicts a system 2400 for simulating a soldier in uniform using the perspective dependent nature of the lens sheet material.

A projector 2402 projects a video or sequence of images through a first lens sheet material 2404. In the depicted embodiment, five (5) large pieces of secondary lens sheet material 2406, 2408, 2410, 2412, 2414, each in opposite polarity to lens sheet material 2404, are used to increase the viewable angle.

A black backdrop may be used to hide the background while filming a person wearing a uniform so only the person is shown on the material. Viewers 2416 would perceive the virtual decoy soldier 2418 as a military guard observing the area, even when the viewers 2416 walk around to different angles.

If the virtual decoy soldier 2418 is intended to appear to be defending a location and shooting a gun, it is desirable to have the enemy target the virtual decoy 2418 instead of real or actual combatants. One benefit to the illustrated system 2400 is that bullets should go right through the lens sheet material and have little effect on the material or the video projection. The virtual decoy soldier would still appear to be defending and the enemy would continue to try to hit it, unless the projector is hit. The projector could be protected and placed out of the way using the mirror bounce technique.

Projector 2402 may be implemented using a small battery powered, portable 200 lumens projector. An internal 5 GB memory on the projector 2402 may store video or sequence of images to be projected. This avoids the need for an external device such as computer, which leads to fewer pieces of hardware and a compact size, which is important to soldiers who may have to carry these virtual decoys. In one specific embodiment, projector 2402 was rated to have estimated battery life up to 1.5 hours and often provided close to 2 hours, and the projector included two built in 2.5 watt speakers.

One of the issues when viewing these demonstrations is the reflection caused by the pieces of lens sheet materials 2406, 2408, 2410, 2412, 2414. This may be overcome with antireflective coatings but even the addition of a simple bug screen to mitigate much of the reflection without hindering the projected image too much.

Advantageously, a soldier can both hide behind the set of lens sheets for concealment purposes and project a different image on the sheets toward the viewer for deception purposes, as long as he or she is not between the projector and the first or secondary lenses.

In the depicted embodiment of FIG. 24, each of the five pieces of material 2408, 2408, 2410, 2412, 2414 are all in the horizontal polarization, so that what is viewed is a table below and wall behind and above or the window stretched down as the soldier moves to that side of the material. This provides insight into the best polarization to use for use with soldiers (vertical) hiding behind it so that the background on the material does not appear as an anomaly.

In some situations it may be desirable to have a virtual soldier displayed on a riot shield rather than just hiding behind it, allowing it to show the background. When opening a door, persons on the other side will know something is coming through the door. To stop enemy soldiers from reacting aggressively, such as reaching for their guns, one may project one of their soldiers onto the shield or the janitor or someone familiar. This allows the first person in, extra safety and extra time to observe the room to determine threats from friendlies. This may also be true of soldiers accidently making a noise outside, stepping on a branch and drawing attention to there location. By portraying an animal such as a dog or raccoon onto the material, the viewers will be deceived into thinking a non threat created the noise to continue to hide the soldier or soldiers behind it.

In other embodiments, it is possible to place a small polarized lens directly over a projector lens with the opposite polarization to the viewable lens sheet. This requires lens sheet with very fine lenses.

Many different applications of exemplary embodiments of a display system using the illustrated and demonstrated techniques, and combinations multiple perspective projections to provide 3D holographic style videos or images onto a riot shield or virtual military decoys have many uses in civilian and military applications. It is readily apparent that the invention described herein has potentially wide commercial applications such as advertising, entertainment, architecture, communication, social interaction, home security and law enforcement.

Undistorting Decoys Using Pre-Distortion

In many of the exemplary embodiments described above, it may be observed that the image on the second lens sheet may contains distortions or artefacts that are viewed by the target observer. These distortions may be reduced, minimized or eliminated with an appropriate compensatory pre-distortion at the image source (e.g., a computer) before the image is projected by a projector.

Figure 25:
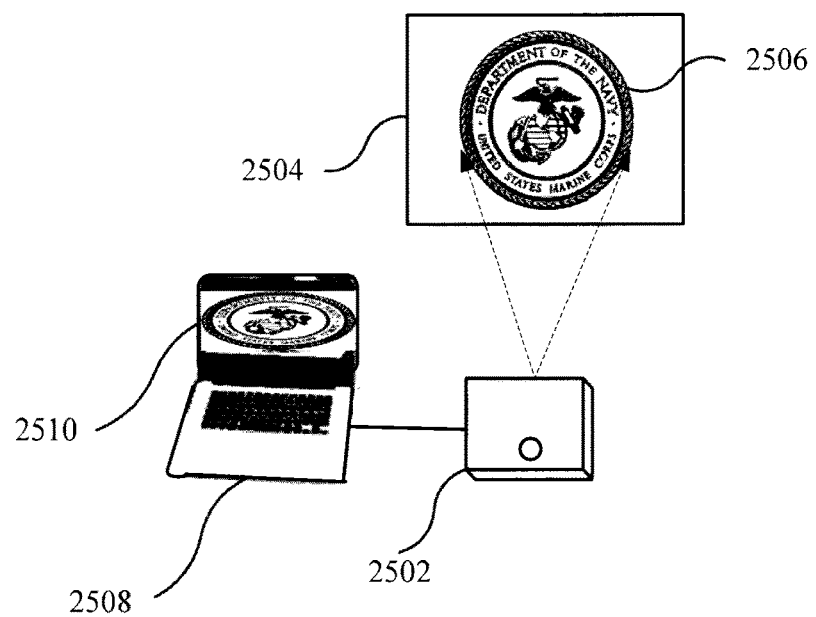
FIG. 25 is a schematic diagram of a system that employs pre-distortion to compensate for distortion artefacts observed in projected images in exemplary embodiments of the present invention.

An exemplary embodiment for reducing the distortion is shown in FIG. 25. An image source 2508 in the form of a laptop computer provides a pre-distorted image 2510 to projector 2502.

Image 2510 is made much wider on the computer so the viewable logo image 2506 displayed on the material or on lens sheet 2504 appears corrected. It will be noted that the pre-distored image 2510 appears oval or elliptical while the corrected image 2506 is circular as intended.

This is due to the inherent distortion in the system of FIG. 25, which would have distorted a clean circular image, now instead has the effect of undistorting the pre-distorted elliptical image 2510. In this example, a mirror bounce technique is used to provide a compact setting for the photo image.

Riot Shields

Figure 26:
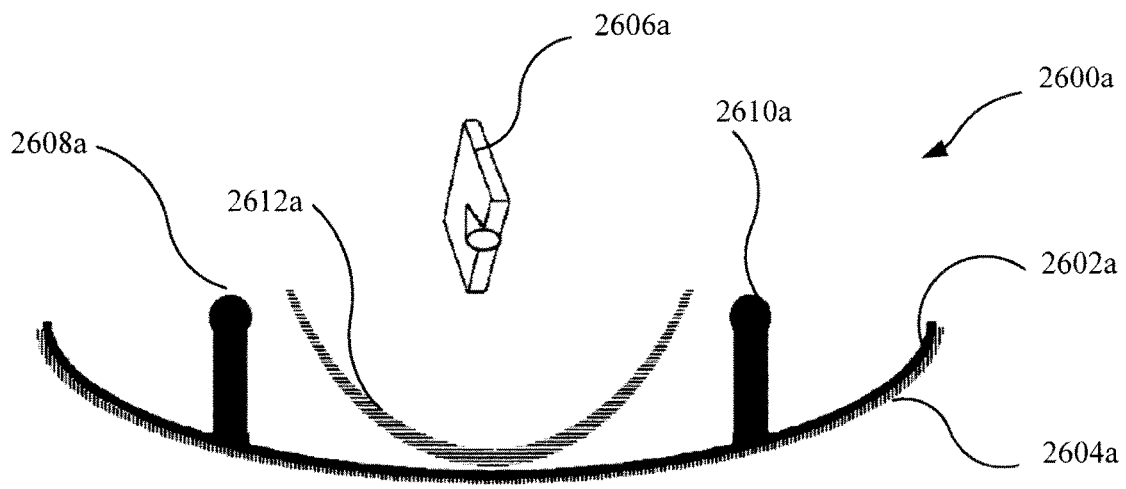
FIGS. 26-28 are schematic block diagrams of riot shields exemplary of embodiments of the present invention.

Other exemplary embodiments of the present invention include riot shields. FIG. 26 depicts a riot shield 2600a having a clear shield body 2602a. In such an embodiment where there is little distance to work with between the person holding the shield using handles 2608a, 26010a and the clear shield body 2602a, a first piece of lens sheet material 2604a on the clear riot shield body touches, or is in close proximity to, the second lens sheet 2612a in the opposite polarity in the vertical center of the shied body 2602a, no correction is required for the aspect ratio, and a projector 2606a can be much closer to the material. However, this may create a gray colored background zone visible from the front appearing behind the decoy or projected image if a black backdrop was used to remove the background during filming. This Gray colored background only appears in the center of the shield between the two handles 2608a, 2610a where the two pieces of lens sheet material 2604a, 2612a are closest to each other. Projectors with a shorter throw distance could be much closer, e.g., attached to longer handles, to achieve the same effect.

The reason the material on the riot shield shows the background so well is that the lens polarization is vertical, this up/down polarization hides a person (a vertical human) in behind while retaining the horizontal elements such as the table edge, wall edge and window frames. The lens sheet refracts the horizontal and hides the vertical.

Figure 27:
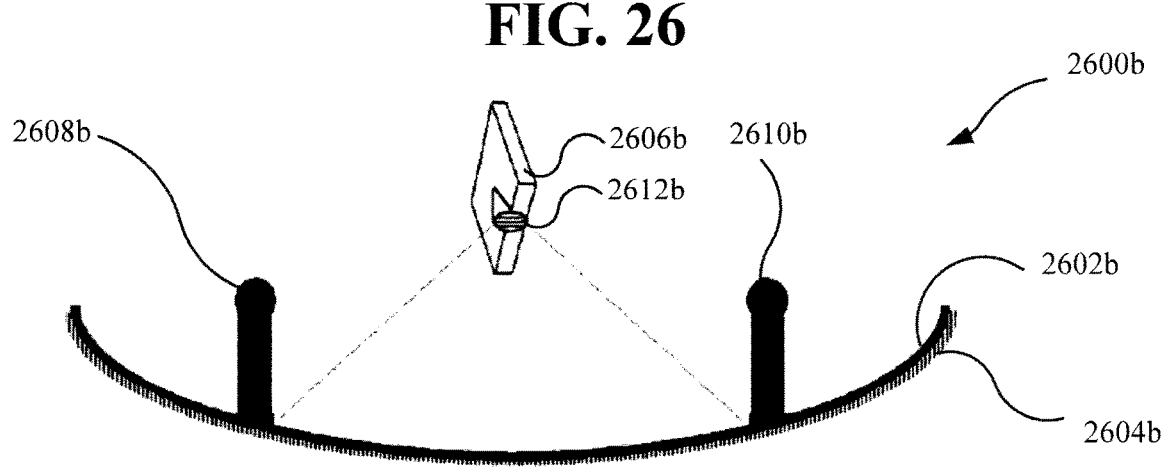

In riot shield 2600b shown in FIG. 27 having handles 2608b, 2010b and a clear shield body 2602b, a first piece of lens sheet material 2604b is formed on the clear shield body 2602b itself while the second lens sheet 2612b in the opposite polarity is formed on the projector lenticular lens of projector 2606b. Projector 2606b can be much closer to the lens sheet material 2604b. Projector 2606b is a short throw projector and the distance could be much closer. This configuration removes the gray background that can be present in FIG. 26 and allows the actual background colors behind the person holding the shield to be displayed as there is sufficient distance between the lenses.

Figure 28:
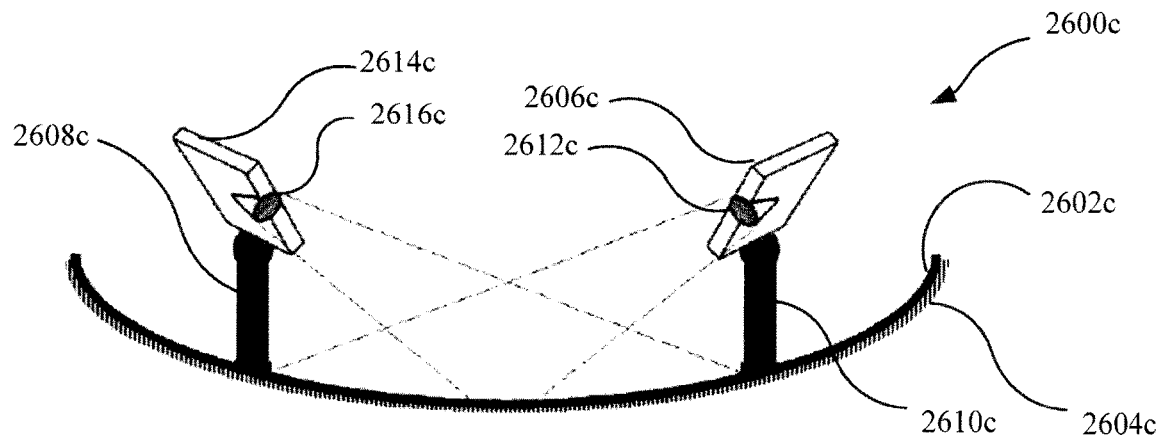

In riot shield 2600c shown in FIG. 28 having handles 2608c, 2010c and a clear shield body 2602c, a first piece of lens sheet material 2604c is formed on the clear riot shield body 2602c itself while the second lens sheets 2612c, 2616c in the opposite polarity (of material 2604c) are formed on the projector lenticular lenses of projectors 2606c, 2614c respectively. Projectors 2606c, 2614c can be much closer to the lens sheet material 2604c. Projectors 2606c, 2614c are short throw projectors and again the distance could be much closer, e.g., attached to longer handles 2608c, 2610c, to achieve the same effect. This configuration removes the gray background that can be present in FIG. 26 and allows the actual background colors behind the person holding the shield to be displayed as there is sufficient distance between the lenses.

In order to project a larger image on this vertical polarization, the video was rotated 90 degrees on a computer, then the projector was turned 90 degrees to correct for the projection as the aspect ratio on this projector and most others is 16:9 (16 wide×9 high). By turning the projector by 90 degrees, it is possible to utilize the longer side (16 units of length) as the height and the shorter side (9 units of length) as width.

Other Applications—Simulated 3D Image

Lenticular lenses may be used to create a simulated three dimensional image of a special image that appears to be placed behind and against the back of the sheet. The images are not physically displayed directly behind the sheet but rather the lenses create an optical effect or optical illusion, in which the image appears to be beyond the back of the lenses or the sheet, to an observer.

Figure 29:
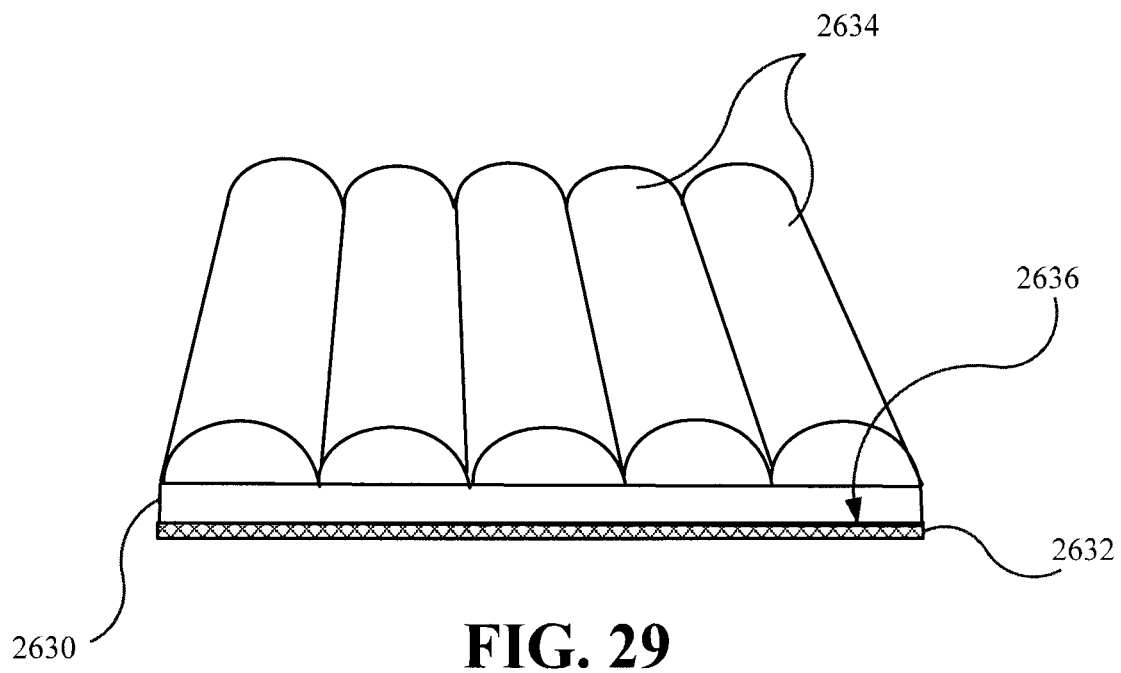
FIG. 29 is a block diagram illustrating lenticular lenses used to simulate a three dimensional image.

FIG. 29 depicts an arrangement used to create a display with a simulated three dimensional effect. A lens sheet 2630 made up of a number of lenticular lenses 2634 is used to create a display with a simulated 3D effect. The lenticular lenses 2634 receive light from a projector of a special produced image 2632 which would go through an opposite polarized lenticular lens prior and corrected with pre-distortion as shown in FIG. 25. The special produced image that is projected would utilize the lenticular printing effect to simulate the motion as it is done with printed lenticular sheets with the printed lenticular image or video ending up behind and against the smooth backside 2636 of the sheet 2630 as shown in the exemplary embodiment depicted in FIG. 29.

In an exemplary embodiment of the present invention, a projection device or projector may be used to project an image or video sequence through a first lenticular lens sheet and a second lenticular lens sheet. The first lenticular lens sheet may contain a plurality of lenticular lenses or convex lenses that run in the same parallel direction, for example left to right, giving the sheet a first polarity.

At a farther distance from the first sheet, the second lenticular sheet containing another plurality of lenticular lenses or convex lenses may be placed or disposed. The lenses in the second sheet run in the opposite direction to the first that is up and down, giving the second sheet a second polarity opposite to the polarity of the first sheet.

The image projected through the first sheet may be stretched due to the proximity of the first sheet to the projection source. The distance between the first sheet and the second sheet can be offset by adjusting the image or video within the projection to compensate for the stretching, so as to make the image on the second sheet appear at a normal aspect ratio.

Other Applications—See-Through Effect

In one specific embodiment, a projector may allow the projected image to be seen on a background of any color. In vehicles, the pillars on the windshield have widened to meet crash test requirements as well as housing air bags. These wide pillars have in turn created large blind spots in vehicles.

Figure 30:
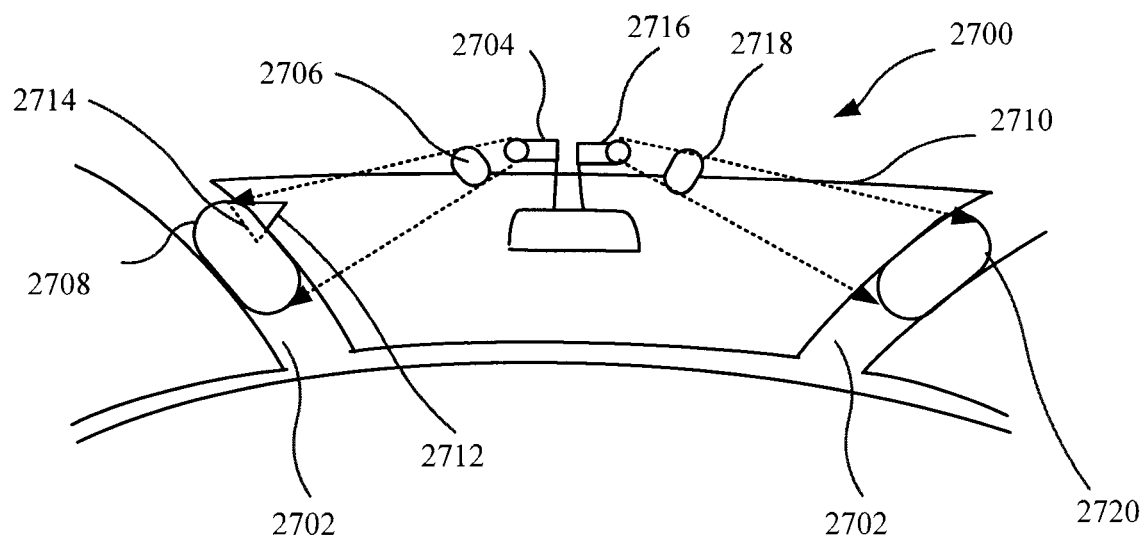
FIG. 30 is a simplified schematic diagram of the interior of a vehicle having pillars used for display of images and video.

FIG. 30 depicts a simplified diagram of the interior of a vehicle 2700 having windshield 2710 and pillars 2702. A short throw projector 2704 on the interior roof of a vehicle broadcasts images and video onto a first sheet 2706 which could be close to the lens of the projector 2704 and not in the way of the field of view for the driver, which is then projected onto a second sheet 2708 covering the pillar 2702.

As will be appreciated, another short throw projector 2716 may be disposed proximate the first short throw projector 2704, to project to a sheet 2718 first and then to another sheet 2720 on the opposite side of the interior of vehicle 2700 in a similar manner, as depicted.

The images and video that are broadcast onto the sheet 2708 are captured by one or more cameras (not illustrated) mounted on the vehicle 2700 recording the exterior environment. This provides the driver of vehicle 2700 with a video view as if through the solid pillar 2702.

As can be seen in FIG. 30, the integrated view of the visible portion of a triangular object 2712 seen through windshield 2700, together with the image 2714 of an otherwise invisible portion of the object 2702 obstructed by the pillar 2702 from the driver's view, but captured by the camera and displayed on sheet 2708, creates the illusion of a driver seeing through the solid pillar 2702.

Currently special reflective materials are needed to allow the image or video to reflect the image to been seen rather than being washed out. White is the most typically used color. However, this has the drawback of limiting the look of the interiors of vehicles. Using the technology described in FIG. 30 any color could be used on the pillar 2702 behind the second sheet 2708.

The Jaguar Land Rover Limited company had demonstrated broadcasting, the hood of one of its off-road vehicles, a video on of what was directly ahead of the vehicle—as if the driver could see through the hood of the vehicle—to provide a less obstructed view for increased safety. In a demonstration of what the company called Discovery Vision Concept, a front-facing camera is used to capture images which are then projected on the lower portion of the windshield so the driver can simulate seeing through the hood. A drawback of this approach is that the color of the hood would have to be within a narrow range for optimal image/video reflection from the projector in daylight.

By using techniques exemplary of the present invention such as that depicted in FIG. 30, the color of the hood may be made any arbitrary color and still retain a good reflection for the driver to see the image or video in daytime. Similar applications of this technology may be employed in cockpits in aircraft, bridges of ships, and control towers at airports.

Broadcasting an image or video onto a wall usually requires a white or retroreflective surface that is usually white. Variations of the exemplary embodiment of the present invention as shown in FIG. 30 may be utilized via a projector or series of projectors so that large images or videos could be displayed on interior or exterior walls, roofs, floors or other backgrounds of arbitrary color.

Broadcasting images from a projector onto a transparent surface often does not yield favorable results. Typically there is a ghost like image displayed on the transparent surface. By utilizing technique, exemplary of embodiments of the present invention as described just above, improve images may be displayed on glass. The second lens sheet may be disposed on the glass to yield a much better image or video sequence with minimal ghosting.

In a variation of the above, boardrooms may be designed using windows as display screens as needed instead of requiring a dedicated screen or a television set or monitor for presentation.

In a related application, very large scale video images may be displayed across a hotel that has many windows, which could allow for inexpensive mega screen advertising by placing many small projectors on the outside or inside of the hotel.

Passive Display Systems

In many of the exemplary embodiments described above, one or more projectors were used to generate the image or video that is displayed on a lenticular lens sheet. However, the inventor has discovered other embodiments in which static or passive images are used to simulate the motion parallax effect—that is, changes in the perceived image of an object over time that changes with observer movement. In this exemplary embodiment, static photos, artwork, logos, images, drawing as well as video display screens may be used.

Figure 31:
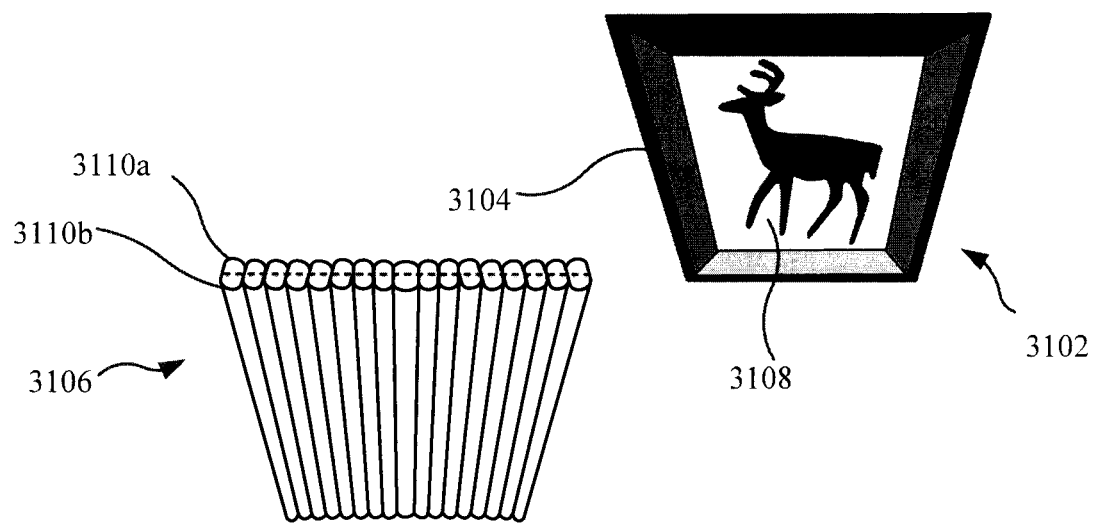
FIG. 31 is a simplified block diagram of components of a passive display system, exemplary of an embodiment of the present invention.

FIG. 31 depicts a simplified diagram of components of a passive display system, exemplary of an embodiment of the present invention, for simulating motion parallax using the perspective dependent nature of lens sheets. A picture frame 3102 has an edge 3104 which is at or about 1 cm above the image matte 3108. A double sided lenticular lens sheet 3106, not necessarily drawn to scale, depicts vertically polarized lenticular lenses. A single sided lens sheet is a typical lenticular lens sheet as depicted in FIG. 2 where one side has a smooth flat surface while the other side contains convex lenses. A double sided lenticular lens sheet contains lenticules or convex lenses on both sides.

Ideally lenticular lens sheet 3106 would be manufactured as one integral piece. However, two lenticular lens sheets may be disposed or placed back to back, along the dotted line shown in FIG. 31, to form the lenticular lens sheet 3106. An adhesive may be used to adhere the backs of the two lens sheets together. The adhesive is preferably a clear permanent adhesive. However, in some specific embodiments, the adhesive may be water. When two single sided lenticular lens sheets are used, corresponding ones of the lenses such as lenses 3110a, 3110b in each sheet are aligned in the same polarity, i.e., vertically to simulate movement side to side, or horizontally to simulate up and down movement.

Figure 32:
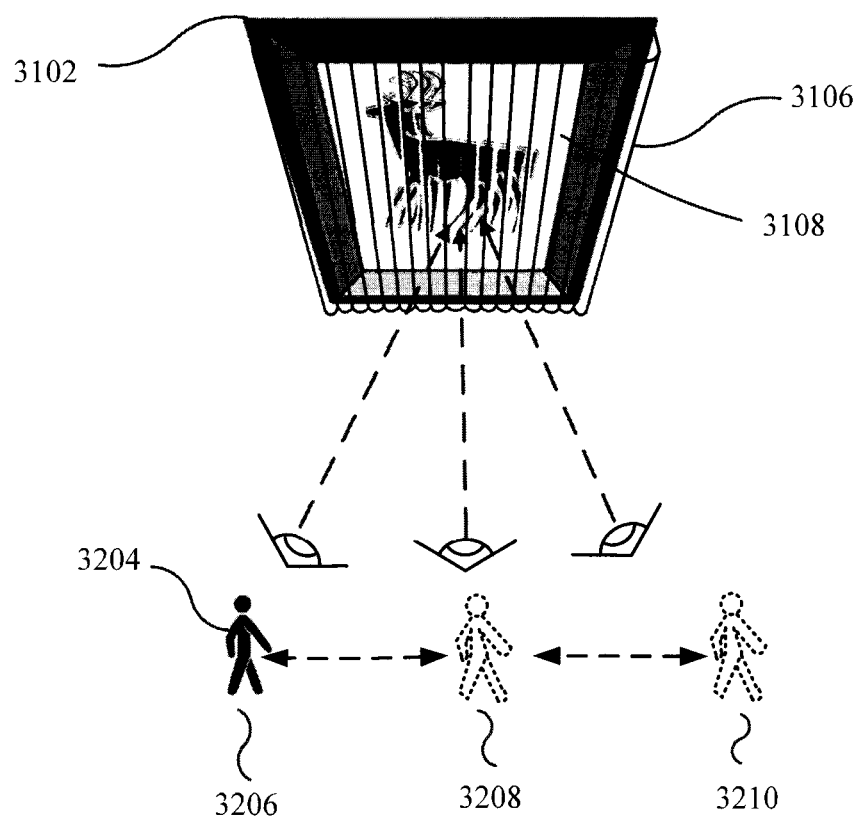
FIG. 32 is a simplified block diagram of a passive display system, constructed using the components of FIG. 31, for simulating motion parallax using the perspective dependent nature of lens sheets.

FIG. 32 depicts lenticular lens sheet 3106 placed on top of the frame 3102. Lens sheet 3106 sits at or about 1 cm above the mounting board or image matte 3108. This distance can be varied for greater or less effect as desired. The viewer 3204 from different vantage points 3206, 3208, 3210 perceives one of the three locations of the image of the animal appearing staggered on the matte 3108 through the lens sheet 3106 depending on their side to side vantage point. If the lenses were configured in the horizontal polarization the image will move up and down depending on the distance or changing height of the viewer 3204.

The effect is similar on video display screens, such as smart phones, tablets, computer monitors, television screens where the lens sheet should be elevated away from the screen similar to the depiction in FIG. 32.

The two lenticular lenses 3110a, 3110b (or one double sided lens) could be curved out towards the viewer in the middle so there is greater distance from the image in the middle, thus greater perceived movement in the middle versus the sides of the image. It could also be curved in towards the middle so there is more perceived movement on the sides versus the middle.

Lenses with different LPI ("lens per inch" or "lines per inch") produce different frequencies of movement. The two lens sheets depicted in FIG. 31 and FIG. 32 are of the same LPI but in other embodiments, the can be different from each other to vary the visual effect.

Figure 33:
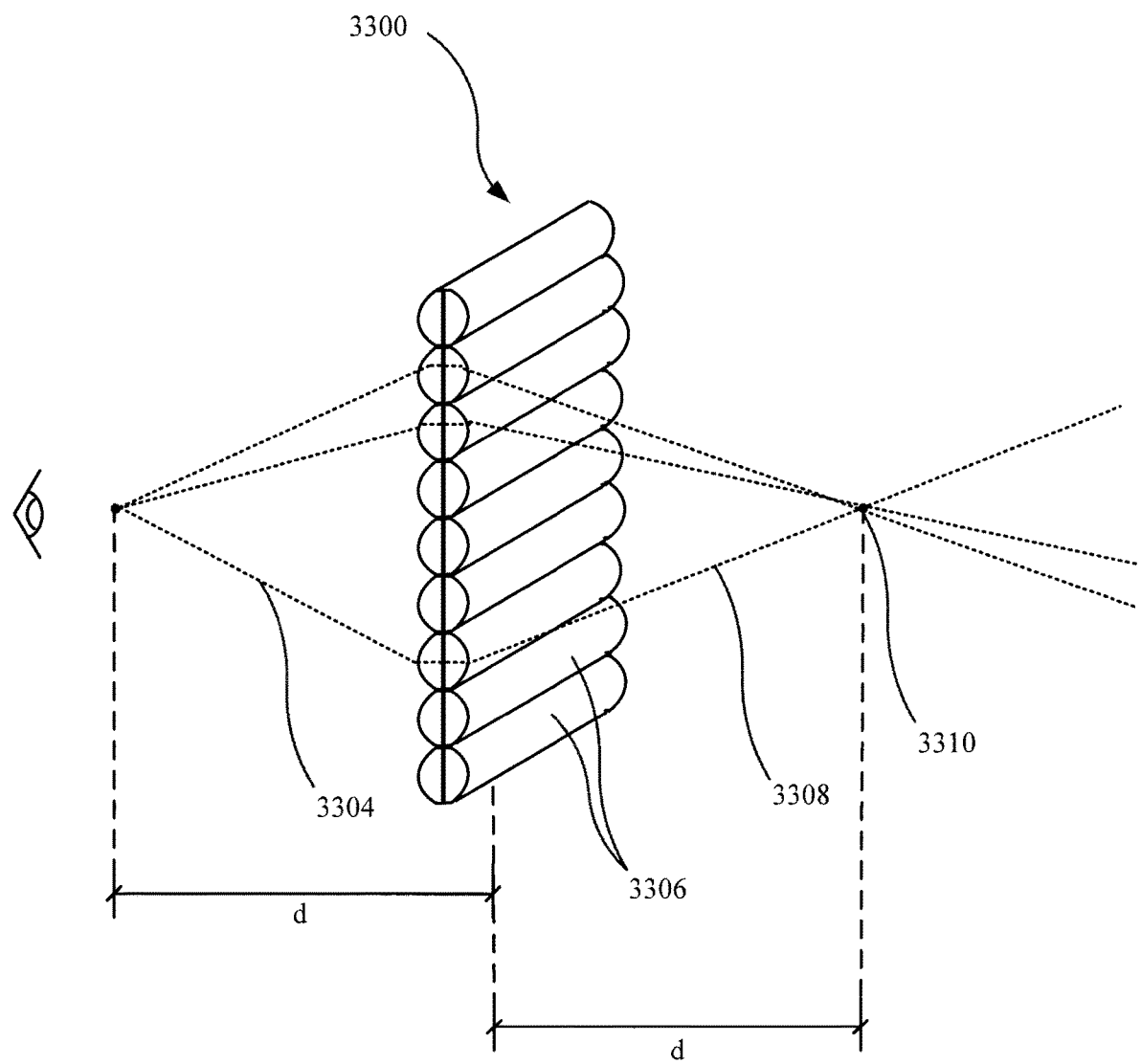
FIG. 33 is a simplified schematic diagram of another double-sided linear lens sheet, made by placing two single sided lens sheets back to back.

FIG. 33 depicts another double-sided linear lens sheet 3300, made by placing two linear lens sheets back to back, similar to lens sheet 3106 but having a horizontal polarity. In this arrangement, an object close-up appears in the correct location but at a particular distance d, the viewed object at location 3310 will appear in the mirror image.

Due to the polarization, the effect is to reflect light rays 3304 into reflected rays 3308 by the back-to-back plurality of lenses 3306 so that they converge at location 3310. Thus objects running in the same polarity can be removed or reduced from view, particularly those in the zone where viewed objects begin to appear in mirror image. While FIG. 33 shows the back-to-back plurality of lenses 3306 running horizontally, the plurality of lenses 3306 may also run vertically (as shown in lens sheet 3106) or even at an angle and still achieve a similar effect. In other embodiments, a lens sheet similar to lens sheet 3300 containing the plurality of lenses 3306 may be curved.

Having thus described, by way of example only, embodiments of the present invention, it is to be understood that the invention as defined by the appended claims is not to be limited by particular details set forth in the above description of exemplary embodiments as many variations and permutations are possible without departing from the scope of the claims.

What is claimed is:

1. A display system comprising:
a first lens sheet having a first polarity for receiving an image from a first projector;
a second lens sheet having a second polarity proximate the first lens sheet;
wherein the first polarity is opposite the second polarity and, upon the first projector projecting a first image through the first lens sheet onto the second lens sheet, the first image is visible on the second lens sheet but not on the first lens sheet.

2. The display system of claim 1, wherein the first lens sheet is smaller than the second lens sheet.

3. The display system of claim 2, wherein the first lens sheet is closer to the first projector than to the second lens sheet.

4. The display system of claim 3, wherein the first projector comprises a projector lens and the first lens sheet is formed over the projector lens.

5. The display system of claim 1, further comprising:
a second projector connected to a second image source, the second projector proximate the second lens sheet, wherein the second projector projects a second image in an opposite direction onto the first lens sheet through the second lens sheet,
wherein the second image is visible on the first lens sheet but not on the second lens sheet.

6. The display system of claim 1, further comprising a mirror disposed proximate the first lens sheet and the second lens sheet, wherein the first image projected by the first projector passes through the first sheet, reflects off the mirror and is displayed on the second sheet.

7. The display system of claim 5, further comprising a mirror disposed proximate the first lens sheet and the second lens sheet, wherein
the first image projected by the first projector passes through the first sheet, reflects off the mirror and is displayed on the second sheet; and
the second image projected by the second projector passes through the second sheet, reflects off the mirror and is displayed on the first sheet.

8. The display system of claim 1, wherein at least one of the first lens sheet and the second lens sheet, is curved.

9. The display system of claim 1, wherein the first polarity is horizontal and the second polarity is vertical.

10. The display system of claim 1, wherein the first polarity is vertical and the second polarity is horizontal.

11. The display system of claim 1, wherein the first lens sheet having the first polarity comprises lenticular lenses disposed in parallel aligned to a first direction, and the second lens sheet having the second polarity comprises lenticular lenses disposed in parallel aligned to a second direction, wherein the first and second directions are oriented at 90 degrees or at 270 degrees to one another.

12. The system of claim 8, wherein the at least one of the first lens sheet and the second lens sheet is cylindrical in shape.

13. The system of claim 8, wherein the at least one of the first lens sheet and the second lens sheet is spherical in shape.

14. The system of claim 1, wherein the at least one of the first lens sheet and the second lens sheet is polyhedron in shape.

15. A display system comprising:
a first lens sheet having a first polarity;
a second lens sheet having a second polarity proximate the first lens sheet;
wherein the first polarity is opposite the second polarity and wherein upon a first projector and a second projector projecting a first image and a second image respectively, through the first lens sheet onto the second lens sheet, the first image and the second image are visible on the second lens sheet but not on the first lens sheet, and
wherein at a first location relative to the second lens sheet the first image is visible to an observer but not the second image, and at a second location relative to the second lens sheet, the second image is visible to the observer but not the first image, said second location different from the first location.

16. The display system of claim 15, wherein the first lens sheet is smaller than the second lens sheet.

17. The display system of claim 16, wherein the first lens sheet is closer to the first projector than to the second lens sheet.

18. The display system of claim 17, wherein the first projector comprises a projector lens and the first lens sheet is formed over the projector lens.

19. The display system of claim 15, further comprising at least one of the first projector and the second projector.

20. The display system of claim 19, comprising both the first projector and the second projector.

21. A display system comprising:
a first lens sheet having a first polarity for receiving an image from a first projector;
a plurality of secondary lens sheets each having a second polarity arranged adjacent one another to form at least partially enclosed space, proximate the first lens sheet;
wherein the first polarity is opposite the second polarity, the first projector projects images onto an inner surface of at least one of the second lens sheets through the first lens sheet, and an observer looking at outer surfaces of any two different ones of the secondary lens sheets from outside the enclosed space, observes different views of a virtual decoy image that appears formed within the enclosed space.

22. The display system of claim 21, wherein the first lens sheet is smaller than the second lens sheet.

23. The display system of claim 22, wherein the first lens sheet is closer to the first projector than to the second lens sheet.

24. The display system of claim 23, wherein the first projector comprises a projector lens and the first lens sheet is formed over the projector lens.

25. The display system of claim 21, wherein said lens sheet plurality of secondary lens sheets are each rectangular in shape.

26. The display system of claim 21, wherein said second polarity is horizontal.

27. The display system of claim 21, wherein said plurality of secondary lens sheets number five.

28. The display system of claim 21, wherein an object placed in the enclosed space is hidden from view of the observer.

29. A method of using of lens sheets comprising:
placing a first lens sheet having a first polarity proximate a second lens sheet having a second polarity, the first polarity opposite that of the second polarity; and
projecting image data representative of an object through the first sheet onto the second sheet, wherein upon a first projector projecting a first image through the first lens sheet onto the second lens sheet, the first image is visible to a viewer on the second lens sheet but not on the first lens sheet.

30. The method of claim 29, wherein the first lens sheet is smaller than the second lens sheet and wherein said placing comprises disposing the first lens sheet is closer to the first projector than to the second lens sheet.

31. The method of claim 30, wherein the first projector comprises a projector lens and said disposing comprises forming the first lens sheet over the projector lens.

32. The method of claim 29, wherein displayed image on the second sheet appears distorted, the method further comprising:
   pre-distorting the image data representative of the object so that projected image on the second sheet appears undistorted.

33. The method of claim 29, wherein providing the image data representative of the object comprises capturing digital photographic image of the object against a black background.

34. The method of claim 29, wherein the second lens sheet is disposed on a structure blocking a portion of the object to the viewer, wherein said first image visible to the viewer corresponds to the portion of the object blocked from the viewer so that the first image and viewable portion not blocked by the structure, form an integrated view of the object to the viewer.

\* \* \* \* \*